(12) United States Patent
Harjula et al.

(10) Patent No.: US 9,218,463 B2
(45) Date of Patent: Dec. 22, 2015

(54) TRUST MAP MANAGEMENT AND USER INTERFACE

(71) Applicant: Venafi, Inc., Salt Lake City, UT (US)

(72) Inventors: Tero Petteri Harjula, Espoo (FI); Bryan Robert Lence, Salt Lake City, UT (US); Daniel G. DeBate, Lehi, UT (US)

(73) Assignee: Venafi, Inc., Salt Lake City, UT (US)

( * ) Notice: Subject to any disclaimer, the term of this patent is extended or adjusted under 35 U.S.C. 154(b) by 0 days.

(21) Appl. No.: 14/186,713

(22) Filed: Feb. 21, 2014

(65) Prior Publication Data

US 2015/0242594 A1 Aug. 27, 2015

(51) Int. Cl.
*H04L 29/06* (2006.01)
*G06F 21/00* (2013.01)

(52) U.S. Cl.
CPC ............... *G06F 21/00* (2013.01); *H04L 63/20* (2013.01)

(58) Field of Classification Search
CPC ....................................................... H04L 63/20
USPC ............................................................. 726/6
See application file for complete search history.

(56) References Cited

U.S. PATENT DOCUMENTS

| | | | |
|---|---|---|---|
| 8,675,517 B2 * | 3/2014 | Swan | 370/254 |
| 2010/0122173 A1 | 5/2010 | Hughes et al. | |
| 2010/0138925 A1 | 6/2010 | Barai et al. | |
| 2013/0133023 A1 * | 5/2013 | Burstein et al. | 726/1 |
| 2013/0237249 A1 * | 9/2013 | Stewart | 455/456.2 |
| 2013/0247148 A1 | 9/2013 | Nappier et al. | |

FOREIGN PATENT DOCUMENTS

| WO | WO-2013009621 A1 | 1/2013 |
|---|---|---|
| WO | WO-2013093209 A1 | 6/2013 |

OTHER PUBLICATIONS

International Application Serial No. PCT/US2015/016754, International Search Report mailed May 28, 2015, 3 pgs.
International Application Serial No. PCT/US2015/016754, Written Opinion mailed May 28, 2015, 10 pgs.

* cited by examiner

*Primary Examiner* — Longbit Chai
(74) *Attorney, Agent, or Firm* — Schwegman Lundberg & Woessner, P.A.

(57) ABSTRACT

In an example embodiment, a user interface is presented for interacting with a trust map identifying trust relationships between clients/users and servers/hosts. The trust relationships are defined by public/private key pairs in Secure Shell (SSH), Secure File Transfer Protocol (SFTP), Transport Layer Security/Secure Sockets Layer (TLS/SSL), Secure Multipurpose Internet Mail Extensions (S/MIME), Internet Protocol Security (IPsec), and so forth. A selected entity such as a server, client, client/server, key set, policy, and so forth is selected and displayed at the center of a hub/spoke diagram. Non-selected entities having a trust relationship with the hub entity are displayed as spokes. Similar spoke entitles may be grouped together. Trust relationships and related properties are displayed as lines between the hub and spoke entities. A user performs actions on the entities by manipulation of the hub, spoke, trust relationship and related user interface elements.

20 Claims, 18 Drawing Sheets

Client/Server to Client/Server "Service Connection Out and In + Source Rest. Out"

Client/Server to Server "Service Connection Out + ROOT"

Client to Server "User Connection Out + Forced Command + Source Restriction"

Client to Client/Server "User Connection In + Client Violation"

TRUST MAP MANAGEMENT AND USER INTERFACE

FIELD

This application relates generally to managing trust relationships between computer systems and, in an example embodiment, a system with a user interface that allows trust relationships to be displayed, visualized and managed in environments employing Secure Shell (SSH), and other such protocols between computer systems.

BACKGROUND

SSH is a protocol that leverages public key cryptography to authenticate and secure access among computers in a computer network. SSH secures, among other things, Telnet-related operations. Telnet has traditionally been used for remote management of various systems such as Unix, Linux, and Unix-like computers, routers, switches, firewalls, and other appliances and systems running a variety of operating systems. It has also been used for automated connections between systems via scripting and batch processing. SSH secures Telnet connections by authenticating servers to which a user or system is connecting (ensuring they are not connecting to the wrong server), encrypting the connection to the server (so private data is not publicly viewable), and optionally authenticating the client using public key cryptography as an alternative to usernames and passwords.

File transfer protocol (FTP) has commonly been used along with Telnet to facilitate management and operation of such systems and is subject to the same security challenges. Consequently, protocols such as Secure FTP (SFTP) and Secure Copy (SCP) have been developed to be used alongside SSH and generally use the same public and private keys (Key Pairs) used for SSH for their security. References within this document to SSH also refer to SFTP and SCP.

SSH devices and systems may include SSH clients, SSH servers, and SSH-enabled computing appliances, or virtual machines acting as SSH clients or SSH servers. Separate user accounts may also act as SSH devices.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
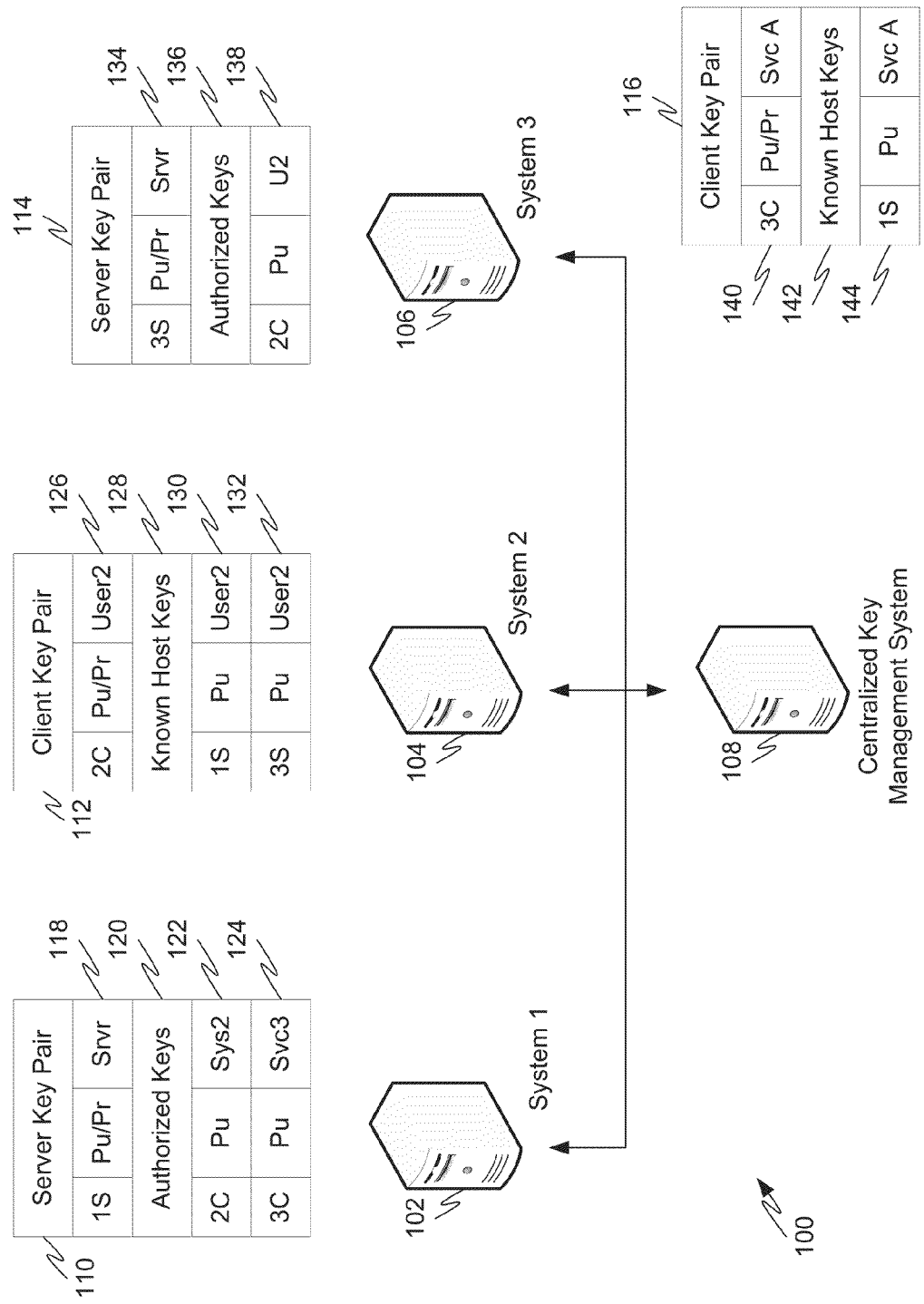
FIG. 1 illustrates a basic representative network 100 using keys for authentication and security.

In the following description, for purposes of explanation, numerous specific details are set forth to provide a thorough understanding of example embodiments. It will be evident to one skilled in the art, however, that the present subject matter may be practiced without these specific details.

Overview

In the SSH protocol, a client (i.e., the system, account, device, user and so forth) initiates a connection with a server (i.e., the system, device, account, and so forth). During the connection request, the client and/or server may verified using public key cryptography so that the client can be assured that the server is who or what it purports to be and/or the server can be assured that the client is who or what it purports to be.

In the simplest configuration, a key pair comprising a public key and a private key may be generated for an SSH server. The public key may be used by one or more SSH clients to authenticate the SSH server (e.g., the server may use its private key to encrypt, or sign, something which the public key may decrypt, or verify a signature, thus indicating to the SSH client the identity of the SSH server). The SSH clients may store the public key after the first connection with the SSH server, creating a trust relationship between the SSH client and SSH server. The stored SSH server public key may be referred to as a "known host key." A key pair may be generated for a client to authenticate the client to SSH servers using public key cryptography instead of usernames and passwords. The SSH servers to which the client connects may store its public key, creating a trust relationship between the SSH server and client in which the stored key may be referred to as an "authorized key."

Although the infrastructure and protocols are different, systems using the Public Key Infrastructure (PKI) standards such as X.509 certificates operate similarly. Thus, although the disclosure below is often described in terms of keys, trust relationships, clients, servers and so forth, the description may apply not only to SSH type infrastructure and systems, but also other infrastructure and systems such as PKI, X.509 and so forth.

Illustrative embodiments, described in greater detail below, include representative user interfaces, methods and systems for presenting and managing trust relationships, keys, policy compliance and so forth for clients, servers, and client/servers. Information representing various aspects of a trust map are displayed in a hub and spoke arrangement, where the hub represents an entity of interest and the spokes represent other entities having trust relationships with the hub entity. Spoke entities may be grouped together with other spoke entities having similar trust relationships and/or other properties. Lines connecting the hub entity with spoke entities or groups of spoke entities may depict various aspects of the trust relationship between the two entities, such as permissions a client is granted at a server, key options, key characteristics/properties, account types, and so forth.

Various types of information may be represented by shading, color, animation, highlighting, annotation (textual and/or graphical), relative position, and so forth. For example, entities that are out of policy may be indicated differently than entities in policy. Entities having a common property or characteristic may be indicated differently than other entities (e.g., entities located in a common geographic or business location may be located close to each other and entities in a different geographic or business location may be located in a different location close to each other. Information representing the status of an entity, either from the system or from an external source such as a work flow system, may also be indicated.

A user may select an entity using a finger or pointing device such as by touching, tapping, clicking, rollover, selecting by search, selecting from a drop down or pick list, and so forth. Actions may then be performed on the selected entity such as a navigation action, a status action, a policy action, a key action and so forth. The combination of visualization and interaction allow for more complete understanding of the trust relationships and easier management of the trust map, a key management system, and all of the entities managed thereby.

DEFINITIONS

When describing protocols such as SSH or the protocols that use the PKI, many terms are often used interchangeably, making explanations difficult. In this disclosure, the following terms and definitions will be used.

Client means the entity, system, user, device, account, and so forth that initiates a secure connection, such as when a secure connection request is sent. A system, device, virtual machine, groups thereof, and so forth may have multiple clients.

Server means the entity, system, host, device, account, and so forth that receives a secure connection request (e.g., from a client). A system, device, virtual machine, groups thereof, and so forth may have multiple servers.

Client/Server means a system, device, virtual machine, groups thereof and so forth that function both as a client and a server (e.g., has at least one client and at least one server).

Entity is a term that encompasses at least system, device, virtual machine, client, server, key set, key instance, policy, groups thereof and so forth related to key and trust relationship management. An entity (or more particularly its representation, identifier, and so forth) is generally selected in a representative user interface in order to initiate one or more actions with respect to the entity or its representation.

Key pair (KP) means a public/private key combination where the public key may decrypt information encrypted by the private key or verify signatures created by the private key and vice versa.

Key set (KS) means all instances of a particular key pair. The key set may be a client key set or a server key set.

Key instance (KI) means a single instance of a particular key or key set. The key instance may be a client key instance, a server key instance or a key set instance. Key instance may be part of a key set, or a singular occurrence of a public or private key, the latter can be called an orphan key, OPK (other peoples keys), rogue key, unauthorized key and so forth.

Trust set (TS) means one or more key sets that are grouped together for management purposes.

Client Trust (CT) means a trust relationship where it is established that a client private key is linked to the authorized public key on a server. This is often evidenced by way of having the client public key stored in server side authorized key file.

Server Trust (ST) means a trust relationship where it is established that the server public key is known by the client. This is often evidenced by way of having the server public key stored in client side user known host key file and/or global known host key file.

Trust relationship means CT and/or ST. A trust relationship exists where CT and/or ST exist between a client and server.

Trust map means information regarding one or more entities and any trust relationships thereof. Thus, a trust map may comprise information regarding at least one trust set, key set, key instance, and/or combinations thereof. A trust map may include such information as system, device, virtual machine, and so forth where one or more key instance resides, information describing or related to a system, device, virtual machine and so forth such as addresses, geographic location, business location or other identifiers where one or more key instance resides, accounts and account information associated with one or more key sets, key instances (or key instance identifiers), key type, key options/properties, CT information, ST information, policy information, security level, and so forth.

Key expiry means the date at which a key set expires or a time period for key set validity (e.g., a length of time beginning at key provisioning/rotation during which the key will be valid). The key expiry often marks some action on key set such as rotate, whitelist, warn, blacklist, remove, and so forth.

Key options mean one or more options provided by a particular implementation (e.g. SSH or other implementation) such as source control (e.g., allow and/or deny access from a particular source to a particular destination), forced commands, source restriction (e.g., allow and/or deny access based on source such as the address, name, distinguished name, or other identifier of a system or other location from which or to which connection may be made), location control (including geographic, business, current, and so forth), and other options that may apply to limit or grant use of the trust relationship (e.g. no X11 forwarding, no agent forwarding, no port forwarding, etc.) and so forth.

Key properties, also referred to as key characteristics, mean one or more characteristics of a key such as key length, the algorithm used to generate the key and so forth. Key characteristics also include properties about the key such as contact information of a person responsible for or related to the key and so forth.

Orphan key means that only one side of a key pair (e.g., private key without public key; public key without pairing private key). Typically orphan key describes a key instance until the key instance is identified as belonging to a particular key set.

Rogue key means an unrecognized client key which could be an attacker's key, rogue user/client key, and so forth.

Suspect key means an unrecognized orphan key that has not yet been categorized.

Unauthorized key means a client or server key not used according to authorized access policy (e.g., user's public key in authorized keys file in a server that users should have no access).

Key rotation means replacement of key set with new key set. This typically involves replacement of all associated KI.

Key provisioning means adding new CT or ST to a system, device, virtual machine, groups thereof or so forth, including provisioning new KS and related new KI. Key provisioning also includes adding a new KI to an existing KS.

Key removal means removing CT or ST from a system, often accompanied by deleting the key instance that forms the basis of the trust relationship.

Managed system means a system, device, virtual machine, groups thereof, and so forth that is either under management (e.g., has its keys managed by a central key management system) or is otherwise interacting with a centralized key management system (e.g., being brought under management, being searched for key or other information directly or indirectly by the centralized key management system, and so forth).

DESCRIPTION

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

FIG. 1 illustrates a basic representative network 100 using keys for authentication and security, such as using the SSH protocol. In this network 100, systems store keys on server and client systems. Network 100 comprises system 102, which acts as a server. Table 110 depicts the keys stored and used on system 102. The keys illustrated in table 110 indicate that system 102 operates as a server since it stores a server key pair 118. The server key pair 118 is a public/private key pair labeled 1S. In this disclosure, a short unique moniker will stand in place of an actual key. For example, 1S-Pu will stand for the server public key of the server public/private key pair 1S.

In addition to its server key pair 118, system 102 knows several authorized keys, which may be stored in its authorized key file 120. These public keys are labeled 2C and 3C and are associated with accounts Sys2 and Svc3, respectively on system 102. Note that these keys are used by the User2 account on System 104 and SvcA account on system 106, respectively. Public key 2C is illustrated as 122 and public key 3C is illustrated as 124. Public key 122 stored as an authorized key 120 indicates CT exists between the server on system 102 using key pair 1S on system 102 and the client using key pair 2C on system 104. Public key 124 indicates CT exists between the server using key pair 1S on system 102 and the client using key pair 3C on system 106.

System 104 of FIG. 1 operates as a client as indicated by the keys stored on system 104. The keys stored on system 104 are illustrated by table 112. System 104 has a client key pair 126. The client key pair 126 is labeled 2C and comprises a public/private key pair associated with User2. As previously indicated, the public portion of key pair 126 is stored on system 102 as public key 122.

System 104 also knows several server public keys, which may be stored in known host key file 128. These public keys include server public key 1S and server public key 3S, illustrated as public key 130 and public key 132, respectively. Public key 130 indicates ST exists between the client using server key 1S public key for the User2 account on system 104 and the server using server key pair 1S on system 102.

System 106 may include both a server and a client as indicated by table 114 and table 116, respectively. Server key pair 134 is labeled 3S. The server of system 106 knows the public key (2C) for the client on system 104 as indicated by public key 138. Public key 138 is associated with account U2 on system 106. Public key 138 is generally stored in system 106 authorized key file 136 as indicated. Public key 138 indicates CT exists between the server using key pair 3S on system 106 and the client using key pair 2C on system 104.

Table 116 indicates system 106 may operate as a client indicated by client key pair 140, labeled 3C. Client key pair 140 is associated with machine account (sometimes referred to as a service account) Svc A. This client knows about the server using key 1S of system 102 as indicated by public key 144, which is generally stored in known host key file 142. Public key 144 indicates ST exists between the client on system 106 and the server on system 102.

FIG. 1 is a simple example with a few servers and clients interacting. However, it serves the purpose of representing how keys and trust relationships exist between systems. The systems of FIG. 1 may be physical (e.g., a system, device, and so forth), virtual (e.g., a virtual machine), or some combination thereof. For example, on system 106, the server may execute within one virtual machine and the client may execute within a different virtual machine. Alternatively, both may execute on the same physical or virtual machine. In general, systems (physical or virtual) may operate as a server, as a client, or as both a server and a client at different times. As the number of servers and clients grows, the number of trust relationships and keys grow significantly, and the addition of a few more systems can significantly increase the complexity of managing keys. A typical installation may have hundreds, thousands, tens of thousands, or more such keys and/or relationships.

The scenarios of FIG. 1 do not directly illustrate all types of authentication methods used in some embodiments of the disclosure. For example, trust relationships exist in some embodiments where a user uses a password/username type authentication to log into a server rather than the public key type authentication discussed above. In still other embodiments, host-based authentication, sometimes referred to as server-based authentication, is used. Using server-based authentication, a user on a trusted server can log into another server (with the same username) on which this feature is enabled. This authentication is useful in an environment with a trusted server and several untrusted systems. Passwords no longer have to be transferred to the untrusted systems. Server-based trust can be viewed as a ST to ST without any CT. This type of trust relationship and the directional flows thereof may be illustrated by an annotated icon, line, circle or other means in some embodiments to show server-based authentication trust type.

FIG. 1 illustrates a centralized key management system 108 connected to server and client systems. The keys and systems 102, 104 and/or 106 may be brought under management by a centralized key management system 108. Centralized key management system 108 may use various mechanisms to discover key information. For example, suitable centralized key management systems and key discovery are described in application Ser. No. 14/034,010 entitled "Centralized Key Discovery and Management," and application Ser. No. 14/131,635 entitled "System for Managing Cryptographic Keys and Trust Relationships in a Secure Shell (SSH) Environment," both of which are incorporated herein by reference in their entirety.

Thus, after full discovery, centralized key management system 108 may identify and in some embodiments store the discovered information in a central key store. Table 1 below represents example basic information that may be discovered, and if desired, stored by centralized key management system 108. This information represents a basic trust map. From this information, trust relationships may be identified and displayed as a visual trust map according as described below.

TABLE 1

Basic Key Information

| Key | System Where Key Instance Resides | Key Type | Associated Account | System Where Key is From (e.g. location of PR key/connection initiation) |
|---|---|---|---|---|
| 1S | System 1 | Server Key Pair | Server | System 1 |
| 2C | System 1 | Authorized Key | Sys2 | System 2 |
| 3C | System 1 | Authorized Key | Svc3 | System 3 |
| 2C | System 2 | Client Key Pair | User2 | System 2 |
| 1S | System 2 | Known Host Key | User2 | System 1 |
| 3S | System 2 | Known Host Key | User2 | System 3 |
| 3S | System 3 | Server Key Pair | Server | System 3 |
| 2C | System 3 | Authorized Key | U2 | System 2 |
| 3C | System 3 | Client Key Pair | Svc A | System 3 |
| 1S | System 3 | Known Host Key | Svc A | System 1 |

In addition to the above basic information, other information that may be discovered and stored (if desired) includes, but is not limited to:

(1) Key/key pair;
(2) Comments associated with the keys;
(3) Link to the keys (e.g., where to find them);
(4) Known host files (e.g., server name+key);
(5) Authorized key files (e.g., client name+key);
(6) Key owner (e.g., the key holder/user);
(7) Key options;
(8) Key characteristics;
(9) Key permissions;
(10) System addresses (e.g., a network or other address);
(11) System geographic and/or business location;
(12) Security level (e.g., an indicator of the overall security aspects of a system);
(13) Policy information for key instances; and so forth.

Any information regarding entities managed or interacted with by the system 108 may be gathered if it is useful for understanding, creating, managing the trust map and/or the entities. The basic information above represents an example of the minimum information that is generally gathered.

Figure 2:
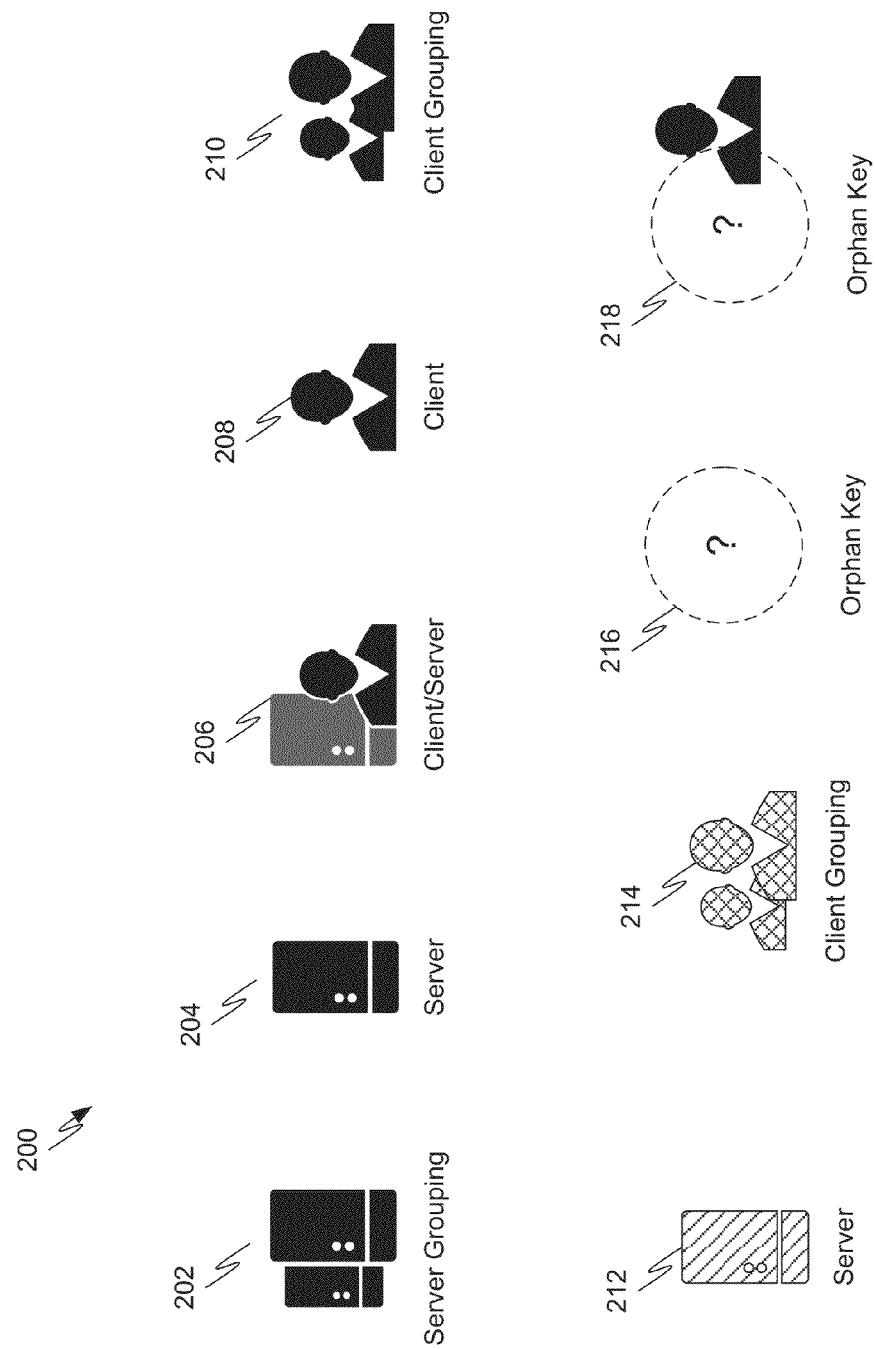
FIG. 2 illustrates representative icons or pictograms used to represent machines, servers, clients, and so forth in some embodiments.

FIG. 2 illustrates representative icons or pictograms 200 that are used in some embodiments to represent machines, servers, clients, and so forth. The term "icons" will be used to indicate a graphical and/or text representation of an entity. The list of FIG. 2 is not meant to be exclusive, but only representative in nature and different icons may be used in different situations. In FIG. 2, a single server is represented by icon 204, a single client is represented by icon 208 and a single client/server is represented by icon 206. Groups of servers are represented by icon 202 and groups of clients are represented by icon 210. Although not shown, if desired groups of client servers may also be represented by icon 206 or the same pattern of doubling the base icon and changing the size of one part of the doubled icon may be used (e.g., like icon 202 and icon 210).

In the representative embodiments described below, color, shading, animation, and so forth may be used to represent different types of information relating to the base icon. Thus, different information is conveyed in different embodiments using color, shading, animation and so forth. For example, in one embodiment a server that is in policy is displayed using a first color while a system that is out of policy has a second color. Other example embodiments are discussed below. Icons 212 and 214 are representative of icons having a different color, shading and/or animation in FIG. 2.

Representative embodiments also depict other entities using different icons. Thus different embodiments use different icons for entities such as systems, devices, virtual machines, clients, servers, key sets, key instances, policies, groups thereof, and so forth. Representative embodiments also use icons and/or annotated icons to represent entities that have a particular state. For example, if an embodiment discovers an orphan key, the system can represent the orphan key with an icon such as icon 216. When the system identifies a possible key set the orphan key belongs to (or should possibly be associated with), in some embodiments the system displays an icon/icons representing the likely candidate(s) in a semi-overlapped fashion as indicated by 218. A user wishing to make the association permanent drags the desired icon (representing the candidate) into the center of the orphan key icon. The system then replaces the orphan key icon with the icon of the entity that has just been associated with the key instance.

Orphan keys may be of several types, such as an orphan public key (e.g., authorized key), an orphan private key, an orphan private key that is a known host key, and so forth. Annotations or other distinguishing features are used in some embodiments to distinguish one from another.

Other entities, such as rogue keys, suspect keys, unauthorized keys, and so forth are represented using an icon, annotation, color, pattern, animation, displayed information and so forth (as well as combinations thereof) in some embodiments.

Representative embodiments can annotate icons to display additional information. In an example, an icon representing a key instance may be annotated with an additional symbol indicating the key instance is a suspected rogue key instance. The list below indicates representative annotations that are coupled with icons to indicate various types of information in various representative embodiments. These annotations are simply representative and different annotations are used in different embodiments. Additionally or alternatively, color, shading, animation and so forth are used in place of, or in addition to, such annotations in some embodiments.

☐, ☑ or similar: the entity has been checked and found to be ok.

⚠ the entity has been checked and there are warnings that should be viewed, examined and/or resolved.

☐: the entity has not yet been checked.

☒, ☐, or similar: the entity has been checked and been determined to be hostile and/or bad in some manner.

: the entity has been "jailed" and connections are allowed only from/to shown hub and/or spoke entity.

🔒 the map and/or entity has been locked and no changes should be made and/or allowed.

Figure 3:
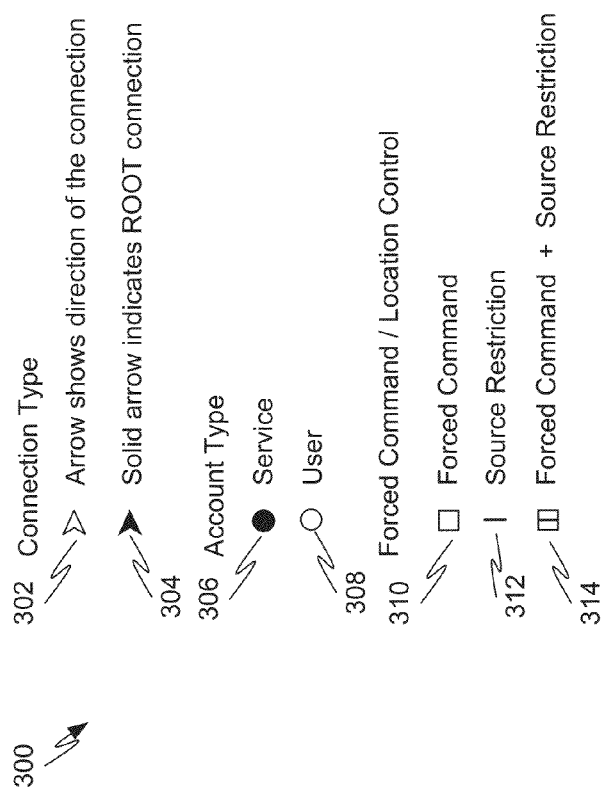
FIG. 3 illustrates representative markers used to represent various aspects to a trust relationship between systems, servers, and/or clients in some embodiments.

FIG. 3 illustrates representative markers 300 that used in some embodiments to represent various aspects to a trust relationship between systems, servers, and/or clients. As described above, there is usually the sense of "directionality" to a trust relationship. For example, CT exists where a client private key is linked to the authorized public key on a server. In other words, in CT trust the client is trusted to initiate and establish connection to the server, shown as connection flow "from" the client "to" the server. Stated another way, the server can trust the client since the server can verify the identity of the client. In ST the server is trusted by the client to, shown as connection flow "from" the server "to" the client; the trust direction is thus reversed (e.g., the client can trust the server since the client can verify the identity of the server). The ST may also be indicated and shown by other means (e.g. icon, marker, different line type, different arrow type, etc), especially where CT flow is to and from between the Hub and Spoke, such as between two client/server entities. In FIG. 3, the arrows 302 and 304 are placed at the end of a line in some embodiments to show the direction of the trust (CT and/or ST) or the direction of the connection (e.g., client to server), depending on what aspect is shown.

Clients may use different types of accounts to connect to servers. The circles 306 and 308 are used in some embodiments to show service (or machine) and user accounts respectively.

Finally, trust relationships between servers and clients are annotated in some embodiments to show different aspects of the keys. For example, key options such as whether forced commands are associated with the key(s), whether the key has source restriction (e.g., is only used and/or accepted from a particular location, system, and so forth), or both is shown in some embodiments using the box 310, the line 312, or the box with line 314, respectively. Additionally, or alternatively, any other properties, characteristics, and so forth can also be annotated in various embodiments such as whether or not X11 forwarding is allowed, whether or not port forwarding is allowed, no agent forwarding, and so forth.

Figure 4:
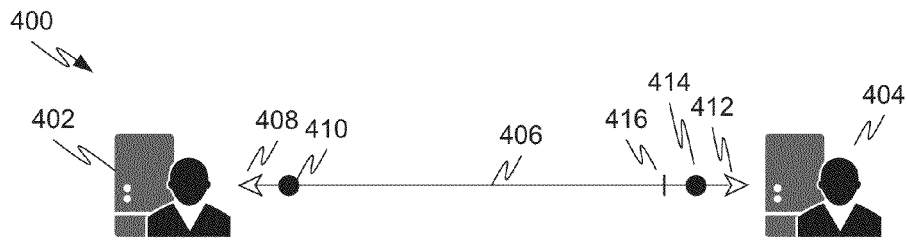
FIG. 4 illustrates representative trust relationships showing how the icons and markers of FIG. 2 and FIG. 3 may be used to express trust relationships.
Figure 4:
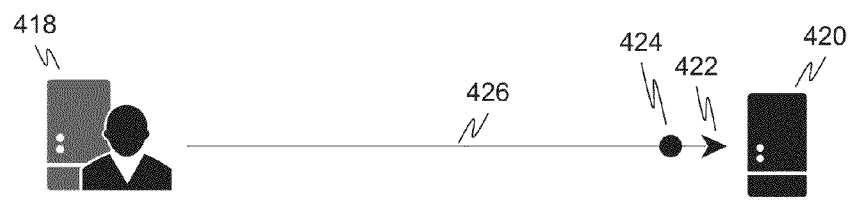
Figure 4:
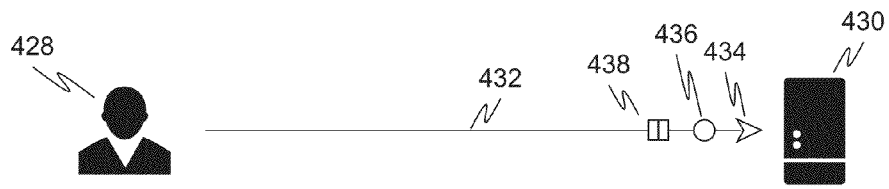
Figure 4:
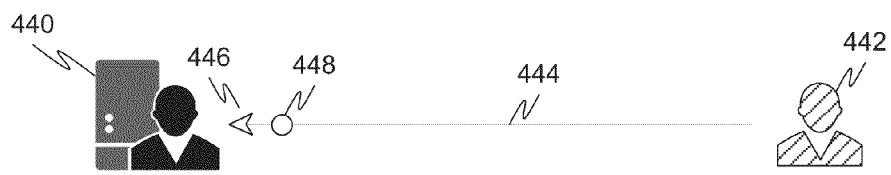

FIG. 4 illustrates representative trust relationships 400 showing how the icons and markers of FIG. 2 and FIG. 3 may be used to express trust relationships in some embodiments. In the descriptions below, the icon on the left side of the relationship will be taken as the "reference" for the "out" and "in" text on the relationship descriptions.

In one representative example, the client/server 402 has a relationship with the client/server 404 as indicated by line 406. As explained below, the relationship is client/server to client/server with service connections both "out" and "in" and source restriction on the "out" relationship. The two arrows on the line, 408 and 412, show that the client of client/server 404 has a trust relationship with the server of client/server 402 and the client of client/server 402 has a trust relationship with the server of client/server 404, respectively. The arrows 408 and 412 indicate there is no root access by either client. The solid circles 414 and 410 indicate that both clients are service accounts as they access their respective servers. Finally the line 416 indicates that there is source restriction for the key being used by the client on client/server 402.

The next representative relationship of FIG. 4 is the client/server 418 to the server 420. The trust relationship is a service account "out" (e.g., the client from the client/server 418 is using a service account to connect to the server 420) as indicated by the solid circle 424. The arrow 422 indicates that the service account client has root access to the server 420.

The next representative relationship of FIG. 4 is the client 428 to the server 430. The trust relationship is a user (as opposed to service) account "out" (e.g., the client 428 is using a user account to connect to the server 430) as indicated by the hollow circle 436. The arrow 434 indicates that the user account client does not have root access to the server 430. Finally, the box/line annotation 438 indicates that the client key from client 428 has both forced commands and source restriction.

The next representative relationship of FIG. 4 is the client 442 to the server of client/server 440. The trust relationship is a user (as opposed to service) account "in" (e.g., the client 442 is using a user account to connect to the server of client/server 440) as indicated by the hollow circle 448. The arrow 446 indicates that the user account client does not have root access to the server 430. In this relationship, the client 442 is shaded differently than the client/server 440. Depending on the shading, color, animation, and so forth, this can indicate that the client 442 is out of policy in some way. As one example, a red color and/or distinctive pattern and/or annotation (such as to take into account problems with color blindness) may indicate clients, servers, and/or client/servers that are out of policy. Policies may apply to different entities in different ways. As a representative example, a policy may include, but is not limited to:

(1) Mathematical requirements for the key/key pair such as key length and algorithm used to generate the key.

(2) Format requirements for the key/key pair, which may be vendor specific (e.g., depend on the particular protocol variant used).

(3) Key file metadata requirements such as requirements for file permissions, key storage locations, access rights control/limitations, and so forth.

(4) Key options requirements such restrictions on which server(s), server address(es), geographical and/or other locations may access the key, restrictions on which users may access a key, an indication of which authentication methods are allowed, an indication of which protocol versions are allowed, an indication of compatibility, forced commands, and so forth.

(5) Key requester/contact/owner requirements (e.g., assignment of, or any restrictions on the requestor, contact and/or owner).

(6) Key approver requirements (e.g., assignment of, or any restrictions on the approver).

(7) Key permission requirements.

(8) Key expiry, requirements.

(9) Grace period.

(10) Action(s) to be taken at expiry, including actions to be taken when the grace period begins and ends. Actions to be taken may include a progression of actions such as send notification (warn), then escalate if certain conditions occur, then rotate/blacklist/whitelist and so forth.

(11) Indication whether the KS should be brought under management.

(12) Indication whether key rollback is allowed

(13) Requirements on key rollback periods.

(14) Requirements for key testing for rollback.

(15) Security level (e.g., a security rating such as high, medium, low which may involve other parameters such as key length, key expiry, and so forth).

(16) Security level restrictions (e.g., cannot connect from a low security to a high security, and so forth).

By analyzing the policy and key/system, a key management system can determine whether something is out of policy and highlight that by shading/coloring/animating the appropriate icon. Where icons represent a group, one entity out of policy can cause the whole icon to be shaded/colored appropriately. A user of the system can identify the details of what is out of policy as explained in greater detail below. Policies may also be hierarchical in nature, and policy items are inherited from higher-level policies in some embodiments.

In the representative examples of FIG. 4, a single line type is used for all the trust relationships. However, information may be conveyed to a user by utilizing different line types for different trust relationship characteristics. As an example, in one embodiment, one line type represents CT and a different line type represents ST. In another embodiment line type represents some status information such as whether the KI that form the basis of the trust relationship have been brought under management. In yet a further embodiment, clients having only ST are shown as nodes not connected to a server (e.g., no line) or are shown using a particular line type for ST. Other information may also be conveyed by varying line type.

As previously discussed some embodiments display server-based ST to ST trust (e.g., server-based authentication). These embodiments illustrate this type of trust relationship and the directional flows thereof by an annotated icon, line, circle, line type, animation, color, fill, pattern, and/or other means.

Orphan key instances are displayed in a variety of ways in various embodiments. An orphan key instance may be a public key instance that is an authorized key (e.g., stored as part of the authorized key file) or a known host key (e.g., stored as part of the known host keys), depending on whether the orphan key is from a server or client. In these situations the system may be able to identify a likely candidate key instance of the corresponding private key using heuristics or some other method. When the system has identified a likely candidate, some embodiments display an icon for the orphan key along with at least one of an annotation, icon, description, and so forth of one or more likely candidates (e.g., such as illustrated by icons 218 of FIG. 2). To the extent a potential trust relationship would be established, an appropriately annotated trust relationship may also be depicted. An Orphan key may also be a private key instance that is found from a client and which key may have CT to entity external to the enterprise, or the private key instance may have CT to a server that is unsupported by management system, or it may have had a CT to a now retired host and so on.

When one or more orphan key instances exist, but it is unclear where the matching key instance may reside (e.g., there is an unknown matching entity), some embodiments place an icon of the appropriate type (e.g., client, client/server, server, and so forth) on the trust map diagram along with suitable indication(s) that the identity is unknown such as outlining, fill pattern, color, animation, and so forth. As an example, one embodiment places the icon representing an entity associated with the orphan key instance such as the orphan key instance, client, server, client/server, system and so forth at the hub (e.g., the hub entity) and places an icon indicating the unknown matching entity in the spoke node location (e.g., the unknown spoke entity) along with a trust relationship indication that does not fully extend between the hub entity and the unknown spoke entity.

As discussed in greater detail below, a trust map can be quite complicated with lots of different information. Some embodiments allow a trust map to be filtered to show only certain types of relationships or other information. Thus, a user can filter by such characteristics as trust type (e.g., ST or CT), entity type, entity characteristic, policy, or any of the entities and/or characteristics discussed herein. Typically the functionality is invoked by a gesture or command such as clicking on an appropriate icon on a tool bar, picking an appropriately filtered view from a pick list, selecting the entities, characteristics, and so forth the user desires to see from an appropriate window, dialog box, tool bar, and so forth.

Figure 5:
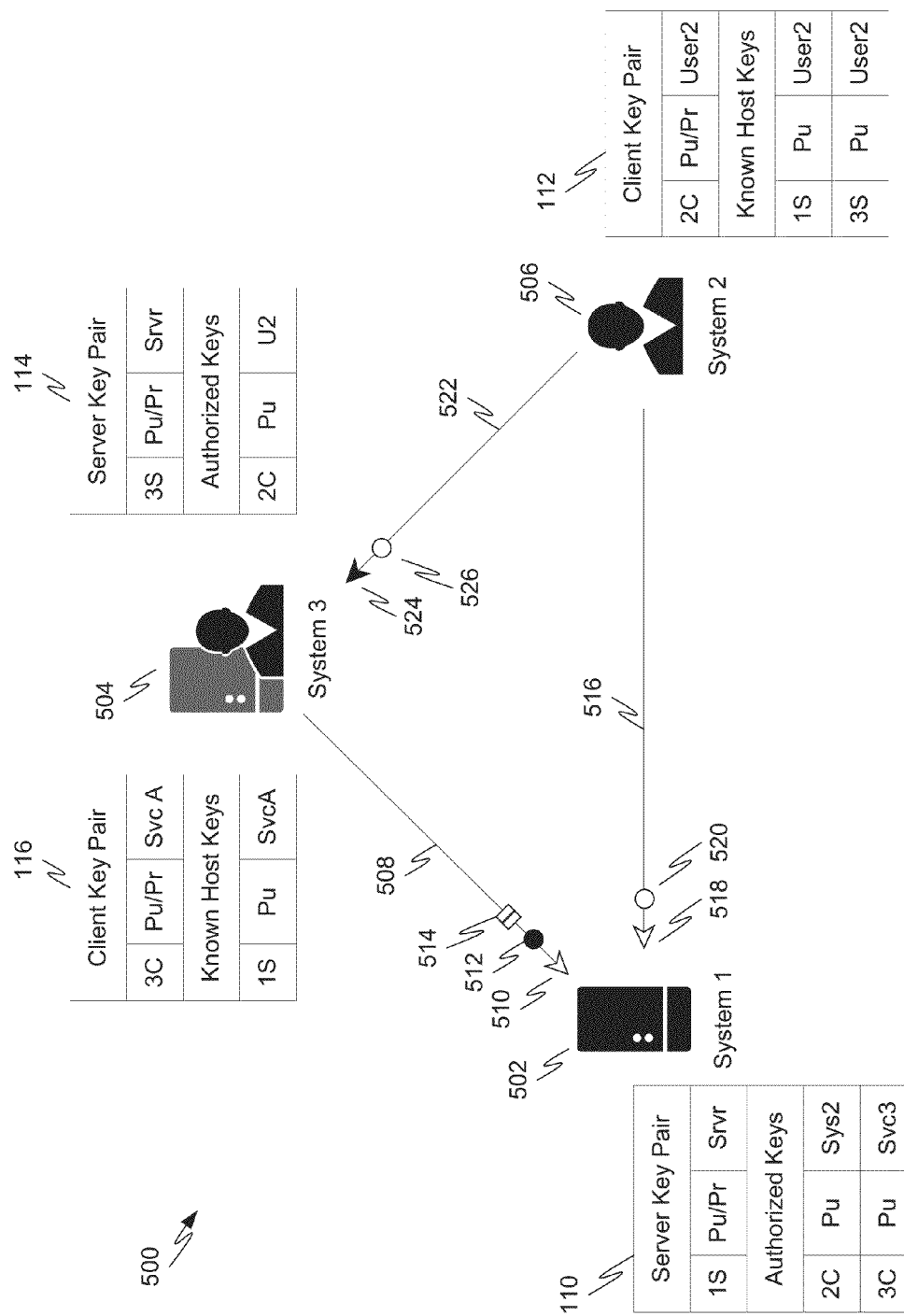
FIG. 5 illustrates representative trust relationships using icons and markers of FIG. 2 and FIG. 3 for the example of FIG. 1.

FIG. 5 illustrates representative trust relationships 500 using icons and markers of FIG. 2 and FIG. 3 for the example of FIG. 1. In FIG. 5, tables 110, 112, 114 and 116 are included for ease of reference. As indicated by the information in the tables (and as summarized in Table 1 above), there is a trust relationship between the client/server 504 and the server 502 as indicated by arrow 508 and arrowhead 510. The arrowhead 510 also indicates that the associated account does not have root access to the server 502. The client account on the client/server 504 is a service account as indicated by the solid circle 512. The box/line graphic 514 also indicates that the key from client/server 504 has forced commands as well as source restriction.

The server 502 also has a trust relationship from the client 506 as indicated by arrow 516 and arrowhead 518. The hollow arrowhead 518 indicates that the client 506 has no root access to the server 502. The hollow circle 520 indicates that the account from the client 506 is a user, as opposed to a service, account.

The server portion of the client/server 504 has a trust relationship from the client 506 as indicated by arrow 522 and arrowhead 524. Since the account on client/server 504 is different than the account on server 502 (e.g., U2 on client/server 504 vs. Sys2 on server 502), the permissions associated with U2 may be different than Sys2. Thus, the trust relationship indicator shows root access (e.g., solid arrowhead 518) by account U2 to the client/server 504. The hollow circle 520 also indicates that the account from the client 506 is a user, as opposed to a service, account.

FIG. 5 illustrates how the icons and markers of FIG. 2 and FIG. 3 may be used to represent entities and trust relationships. However, some embodiments do not present the trust map information in the format illustrated in FIG. 5. In some embodiments, a user would select or indicate an entity from which the trust map should be looked at. This represents, for example, a starting "point of view." The selected entity is placed at the center of the trust map in a hub position and the remainder of the entities having a trust relationship with the selected entity are arranged as spokes with the hub. This is explored in greater detail below.

Figure 6:
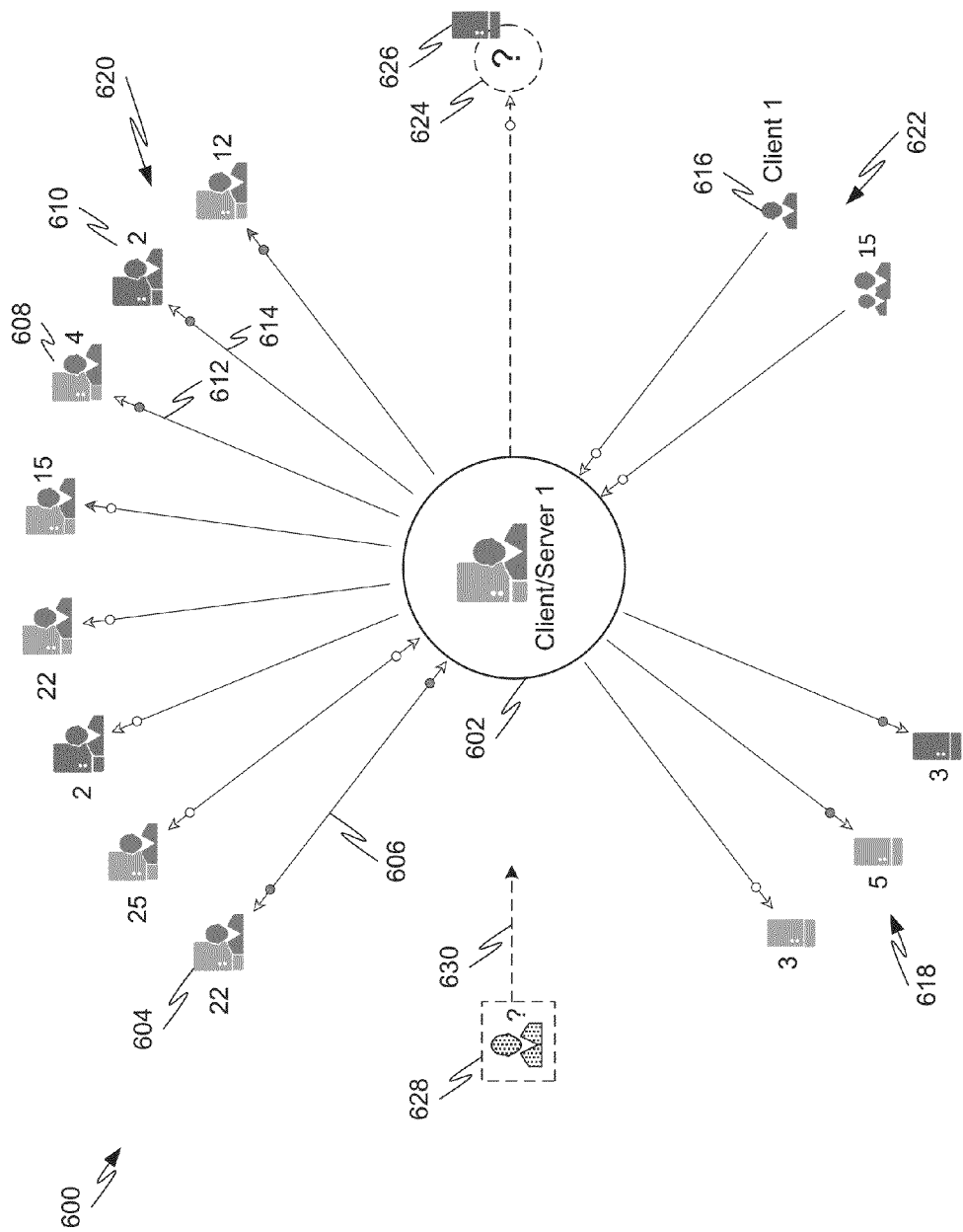
FIG. 6 illustrates a representative user interface using icons and markers to illustrate trust relationships.

FIG. 6 illustrates a representative user interface 600 using icons and markers to illustrate trust relationships. In this figure, a selected entity, such as the client/server 602 is placed at the hub position. As illustrated, the client/server 602 is indicated using the client/server icon from FIG. 3. The hub position also displays the name of the selected entity (client/server 1 in this representative example), although this is not necessarily true of all embodiments.

Once a user selects an entity, such as the client/sever 602, the trust map is drawn with all other entities (e.g., non-selected entities) having trust relationships with that entity. The non-selected entities are displayed in a spoke region relative to the hub with the entities being arranged radially from the hub. Lines/arrows are used to connect the hub to non-selected entities having trust a relationship with the selected entity. The indicators of FIG. 3 are used to indicate characteristics of the trust relationship.

The non-selected entities may be grouped together in regions by some similar characteristic or property such as entity type, geographic and/or business location of the entity and so forth. FIG. 6 illustrates server entities grouped together in one region 618, client/server entities grouped together in another region 620 and client entities grouped together in yet another region 622.

In some installations, there may be many, many non-selected entities that have a trust relationship with the selected entity. Often, too many to easily arrange in a spoke relationship with the selected entity, particularly if the entities are grouped into regions by some characteristic or property. In some embodiments, entities having similar trust relationships may be grouped together within a region. For example, the client/server 602 has a trust relationship with twenty-two other client/servers 604, where the client(s) are machine accounts of the client server 602 that access the server(s) of the twenty-two other client/servers 604 and vice versa. Neither the client(s) of the client server 602 nor the client(s) of the twenty-two other client/servers 604 have root access. This is indicated by trust relationship 606 between the client server 602 and the twenty-two other client/servers 604.

Even if multiple non-selected entities have a similar trust relationship with the selected entity, they may be displayed separately based on other characteristics, such as whether the non-selected entity complies with policy, the location (geographic, business or other) of the non-selected entity, the status of the non-selected entity and so forth. The embodiment illustrated in FIG. 6 two client/servers 610 separately from the four client servers 608, even though the trust relationships are displayed as the same (e.g., 612, 614). The client servers 608 and the client servers 610 may be colored, shaded, highlighted, animated, annotated or otherwise distinguished in order to indicate the differences between the two groups. For example, it may be that the client/servers 610 were out of policy while the client/servers 608 were in policy. In a representative embodiment, such a situation is displayed by presenting the client servers/610 in red while presenting the client/servers 608 in some other color like blue.

In some embodiments, where only a single non-selected entity exists in a group, the system presents the single entity along with its name as indicated by the client 616, labeled as Client 1.

Orphan key instance situations are illustrated in the representative embodiment by the unknown key icon 624, the likely candidate icon 626 and the unknown entity icon 628. Sometimes matching an orphan key cannot be done by the system directly because the system cannot read the matching key in order to directly match the orphan key with a candidate match. This may occur for example in situations where the candidate match is encrypted or where the key resides outside the trust set such as when the key comes from an external system, or when the system where the key resides is not under management. In these situations, the system may be able to determine a likely match based on other clues or heuristics or in some other way.

If a server of the client/server 602 has an orphan key (e.g., the server stores an unmatched authorized key) instance that indicates a trust relationship with a missing client private key (e.g., a client that holds an private key instance that for one reason or another cannot be matched through a direct comparison and that corresponds to the orphan public key instance of the client/server 602), an icon representing an unknown key 624 can be displayed in a spoke entity position. If the system, through heuristics or some other method, is able to identify a likely candidate for the unknown key, the system displays a likely candidate icon 626. A user wishing to establish the association suggested by the system can indicate acceptance of the recommendation by dragging the likely candidate icon 626 into the unknown key icon 624, whereupon the system performs whatever is needed to establish the indicated association. If the unknown key 624 presents and external key, or key belonging to a host is otherwise unreachable to the system (e.g. business partner, roaming user, no agent, temporary host, etc), a user knowing the contact person of such corresponding key can enter the contact details (for example as properties) of unknown key 624, thus establishing a indicated association. Yet another situation can be a private key orphan found from the client of client/server 602 indicating a CT to an external system (e.g. business partner, no agent, temporary host, etc), a user knowing the contact person of such corresponding key can enter the contact details on 624, thus establishing a indicated association.

If the system determines no likely candidates, then the system displays the unknown key icon 624 without a partial overlap in some embodiments. The information that is known about the unknown key 624 is displayed in some embodiments. As an example, if the system determines from examining the trust information that unknown key was held by a client and that the key had both forced commands and source restrictions, the trust relationship arrow would be displayed as starting at the unknown key 624 and terminating at the client/server 602. Some embodiments display appropriate annotations, shading, color, and so forth to indicate that the unknown key had both forced commands and source restriction. Other annotations indicate permissions, the type of account, and so forth, if known.

If an orphan key instance exists that may be related to the hub entity or that may be a likely candidate to be related to the hub, the orphan key instance and/or an entity associated with the orphan key instance is displayed as a spoke entity along with an indication of a possible relationship between the hub entity and the orphan key instance. For example, client 628 has an orphan key instance that may be related to a key instance of hub entity 602, the client 628, with appropriate annotation, coloring, shading, and so forth, is presented in the spoke entity position and a possible trust relationship is indicated in some manner such as no connecting trust relationship line, or a partial trust relationship line 630. The user can establish the relationship by dragging the partial trust relationship line 630 toward the hub entity 602 or in some other fashion.

In some situations, the system detects some action/interaction with an entity and the hub entity, but the system either cannot determine what type of relationship might exist between the entity and the hub entity, the relationship should be evaluated before determining how to represent it or there is an opportunity to provision and/or associate a key instance based on some pact interaction. In other situations, a user might use a username/password authentication without a specific key instance. In still other situations, some action between the entity and hub entity may indicate a rogue key. In any event, when there has been some indication of past action, embodiments of the system can indicate that there was some sort of past interaction by displaying unknown entity icon 628, a regular client icon, client/server icon, or server icon, or other appropriate icon. The past interaction may be indicated to the user by the partial trust relationship line 630.

Dragging the line 630 may perform a variety of actions, depending on the context and the situation. For example, when a client portion of the client/server 602 has an orphan known host key and there is an unknown or encrypted private key at entity 628, the user/administrator can create new CT by dragging the partial trust line 630 to the client/server 602. In another example, a client of the client/server 602 has an orphan known host key and entity 628 has had some action in the past as represented by the partial trust line 630. Once the past action has been evaluated, the user/administrator can break any possible trust by dragging the partial trust line 630 off of the diagram, to a trash can, or in some other way removing it. The user/administrator can mark the entity 628 as a rogue entity or in some other way change the status of the entity.

While the entities placed at the hub and spokes comprise servers, clients and client/servers in the embodiment of FIG. 6, any entity may be selected as the hub entity. For example, in another embodiment KS or KI may be the selected entity so that the selected KS or KI becomes the hub and the spoke entities are entities having a trust relationship with the hub KS or KI. In another embodiment, a private key or private key instance may be selected as the hub entity and the spoke entities are entities having a relationship to the private key (e.g., places where the private key resides or entities having ST with the server where the key resides). A public key may also be selected as the hub in yet another embodiment. Yet another embodiment utilizes a user's keysets as the hub entity and entities having a trust relationship with the user's keysets become the spoke entities. In still a further embodiment, a policy may be selected as the hub entity and entities having a relationship with or utilizing the selected policy may be the spoke entities. Additionally, where inbound and outbound trust relationships exist (e.g., such as where both ST and CT exist between a server and client), the ST and CT aspects are represented in yet another embodiment. One method of representation uses icons and/or annotations such as those already described. Additionally, or alternatively, a tab other control, a filter, a list of options, and so forth is presented to a user to allow the user to switch between one view where ST is represented and another view where CT is presented. In yet a further embodiment, combinations of the above are used.

As previously discussed, numerous entities and information exists that can be presented on a trust map, depending on what a user is interested in seeing. Some embodiments use filtering and/or other controls that allow a user to tailor the trust map to display information of interest while suppressing or eliminating information of no interest. In these embodiments, a user selects a particular view that includes information of interest, brings up a list of information available for display and selects the desired information, creates custom views that include desired information or numerous other options to display desired information and suppress information of little interest. The system can have rules or other functionality to eliminate extraneous clutter, such as bundling entities with common properties as discussed above, collapsing detail into a more summary view, and so forth.

Figure 7:
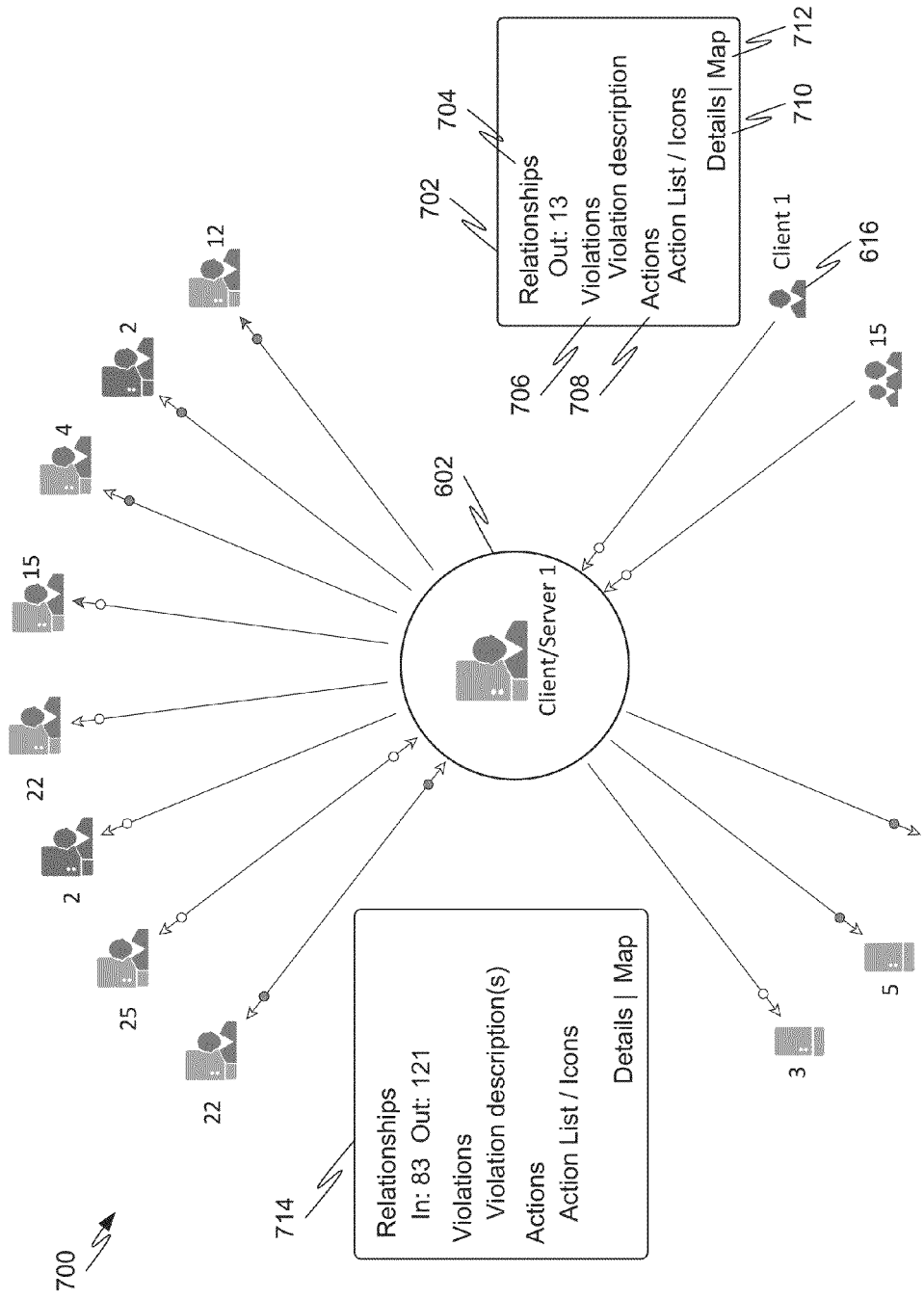
FIG. 7 illustrates a representative user interface using icons and markers to illustrate trust relationships.

FIG. 7 illustrates a representative user interface 700 using icons and markers to illustrate trust relationships. A user of the system may perform gestures or actions that can bring up additional information about a displayed entity (or entities) or perform actions used to manage the entities of the trust map. For example, a user can bring up a context window/menu by hovering over, rolling over, selecting, clicking, or otherwise indicating an entity of interest. For example, if a user selects the client 616, the context window 702 is displayed. Such a context window may be used to display a wide variety of more detailed information or present a variety of actions a user may perform relative to the selected entity. In the embodiment of FIG. 7, a user selects the spoke entity client 616 to reveal the context menu 702. The context menu 702 illustrates the details of the trust relationships 704. In the displayed example, the client 616 has thirteen "out" trust relationships with the client/server 602. These thirteen relationships would come from different KS/KI used to connect to the client/server 602.

In the embodiment of FIG. 7, if the client 616 was out of policy, the context window displays the details of the policy violations 706. As indicated above, policies may be associated at various hierarchical levels and may apply to different entities. Thus, if a particular key policy was violated by one of the thirteen different KS on the client 616, the details of the violation(s) are displayed as indicated by 706. The details may include any information that help a user understand what is out of policy. In one embodiment, the context window 702 lists the violated policy elements. If the violation comes from an inheritance issue, that issue may also be described and/or presented. Policy violations may include any of the policy items listed above. Alternatively, or additionally, key policy violations may include, but are not limited to some combination of:

Key smaller than required;
Key older than allowed;
Illegal algorithm used for key generation;
Illegal protocol version;
Illegal vendor format;
Duplicate private key;
Missing options;
Illegal source control;
Illegal command;
World-readable private key (e.g., permissions on who can read and/or access the key are not set correctly);
Root access (e.g., a key uses root access on the server);
Multiple authorized keys; and so forth.

The context window 702 presents actions 708 that a user can perform or initiate relative to the client 616. Various actions that may be performed are described below. Actions may be represented by text, icon, both, or some combination thereof.

The context window 702 also presents a details selection 710, which a user may select to present further details about the client 616 or some other entity such as a particular KS. Details may include some combination of relevant detailed information. In one embodiment, such details include one or more of:

Entity type;
Distinguished name;
Name;
Description;
Keyset;
Key/Keyset characteristics (e.g., length, key algorithm, forced commands, source restriction, key options, and so forth as discussed above);
Entity policy compliance details;
Entity security classification (e.g., a security rating for the environment/entity such as high, medium, low, 1-5, or the like)
Entity evaluated risk rank (e.g., the relative security risk the entity and/or its configuration present);
Entity number of Policy violating keys (e.g., the key policy violations discussed above);
Entity critical alerts (including number and type such as those listed below)

Orphans alerts such as private key orphan, root access orphan, user access orphan and the like;

Other alerts such as multiple private key owners, key age, known bad key, understrength key, dangerous combination of configuration options, risk points allocated and so forth; and Other information.

The context window 702 also presents a map option 712 which will redraw the map with the selected entity as the hub. A user may also initiate this action in other ways as described below. As indicated above, users may also select different views such as keeping the current hub entity but showing the "out" relationships (as opposed to the "in" relationships). The same effect is achieved in some embodiments by clicking the "in" or "out" relationship indicators of the window 702.

Context windows may be applied at any level of the presented trust map. Thus, the context window 714 applies to the hub entity (the client/server 602). It can be accessed in the same or a similar manner as context window 702, such as by clicking, touching, tapping, right click, roll over or otherwise indicating the hub. The context windows may be customized to the particular entity/entity type. For example, in one embodiment the context window for the hub is customized for the hub location and for the entity selected as the hub and the context window for the spoke is customized for the spoke and for the entity placed at the spoke.

A user interface such as those illustrated herein may not only be used to convey information about a trust map, but may also be used to manage the entities of the trust map by initiating actions in a variety of ways. The manner in which actions are initiated may vary from embodiment to embodiment or an embodiment may have multiple ways of initiating actions (either the same or different actions). In one embodiment, tool bars are presented and a user initiates actions by making a selection from the tool bar. In another embodiment, icons or actions are "dropped" or "painted" on entities to initiate the action. In still another embodiment, actions are initiated by making a selection from a context window. In yet another embodiment, actions are initiated from a menu of some sort.

Figure 8:
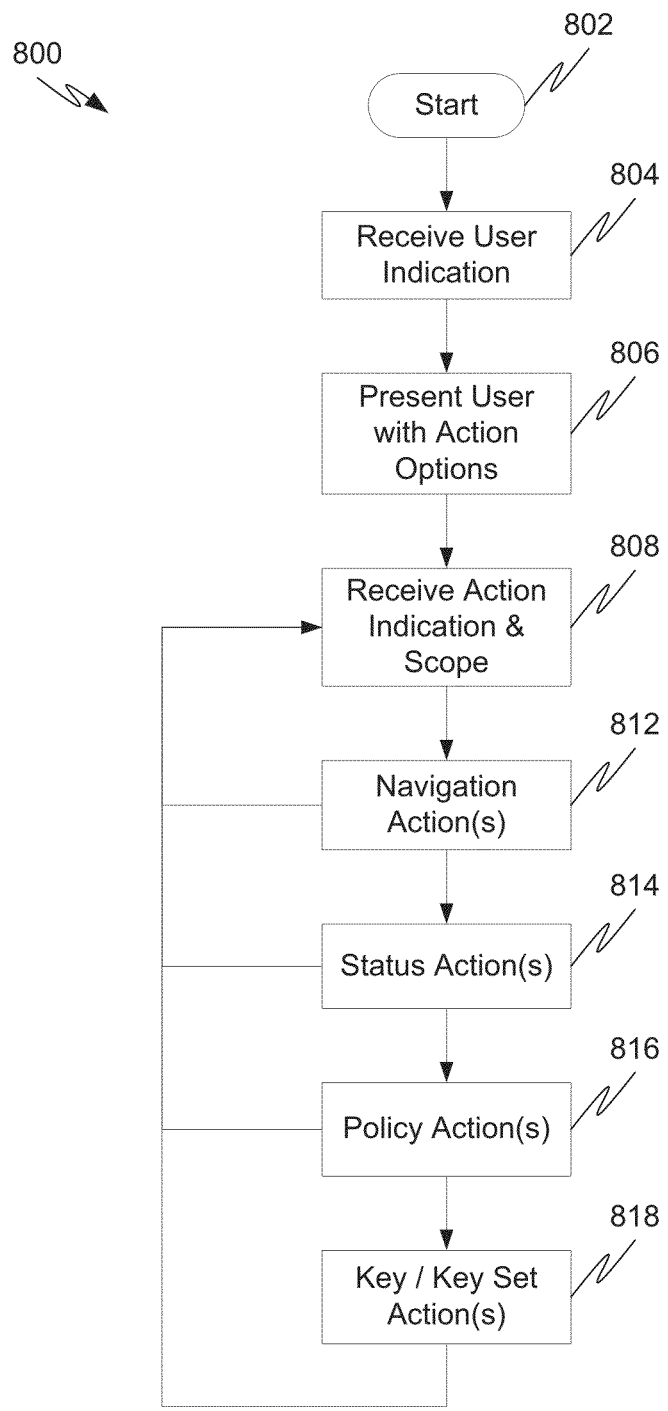
FIG. 8 illustrates representative actions that may be performed using one of the representative user interfaces.

FIG. 8 illustrates representative actions 800 that may be performed using one of the representative user interfaces. In operation 804 the system receives an indication from a user, other system or so forth that an action is to be performed. Operation 806 presents the user with action options, if applicable. For example, in one embodiment, a user may roll over or otherwise bring up a context window (operation 804) and the system will present at least some available actions in the context window (operation 806).

Actions typically have an associated scope, which may be indicated explicitly or contextually (e.g., by the context in which the action is invoked). As an example, in one embodiment an action to "make compliant" (discussed below) is applied to a single entity if it is invoked in one way or is applied to the whole trust map if invoked in a different way. The action to be performed and the scope that the action applies to is identified in operation 808.

In some embodiments, actions fall into general categories such as navigation actions (operation 812), status actions (operation 814), policy actions (operation 816) and key and/or keyset actions (operation 818). The remaining operations of FIG. 8 represent identifying which action is to be performed and then performing the action. In many embodiments, explicit decoding of the action may not be necessary as selection of a particular action (such as by a tool bar or context window) results in a call to the appropriate functionality. In such embodiments the flow diagram of FIG. 8 represents the effective result rather than the specific implementation utilized by the operating system and/or application to invoke a particular function.

Figure 9:
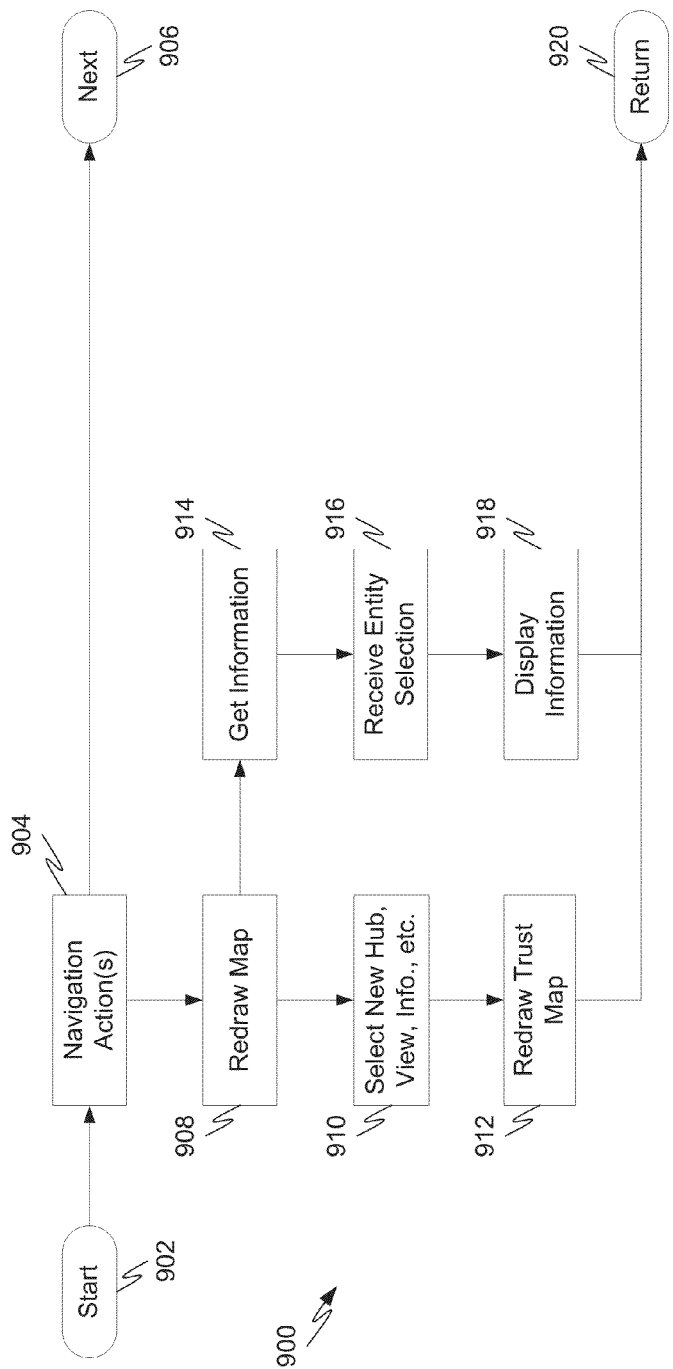
FIG. 9 illustrates representative actions that may be performed using one of the representative user interfaces.

FIG. 9 illustrates representative actions 900 that may be performed using one of the representative user interfaces. In this figure, representative navigation actions are presented and discussed. The operation begins at start indicator 902 after which navigation actions operation 904 represents ensuring that the user has indicated a navigation action. If the user has not indicated a navigation action, then operation proceeds to next indicator 906 which may then proceed to one of FIGS. 10-12 to further determine what type of action the user has indicated.

Representative navigation actions in FIG. 9 include an action to redraw the trust map at a newly indicated hub entity, change the view, and/or get further information about a selected entity. The operation 908 illustrates the action to redraw the trust map at a newly indicated hub entity, for a new view, or some other desired change. An indication to redraw the trust map at a newly indicated hub includes an indication that the trust map should be redrawn and a selected entity to redraw the trust map around. An indication that the trust map should be redrawn is initiated in different ways in different embodiments. For example, in one embodiment a user selects a "redraw trust map" or "select new hub entity" action from a tool bar, context window or other location. In other embodiments, a selects a new entity such as by touch, tapping, clicking, rollover, search, selecting from a pick list, dropdown list or other such list, or combinations thereof and either selects the action to be performed (e.g., "redraw trust map") or drags the entity to the center hub.

Operation 910 represents determining which hub entity the user has indicated. As discussed above in different embodiments, a user indicates a new hub entity in a variety of ways such as selecting by touch, tapping, clicking, rollover, search, selecting from a pick list, dropdown list or other such list, dragging an entity to the center hub, or combinations thereof. In one embodiment, a user indicates a new hub entity by selecting the hub entity by clicking or touching on one of the user interfaces discussed above. In another embodiment, a user indicates a new hub entity through search and/or selection as discussed below. Selected hub entities include, but are not limited to at least one of, server, client, client/server, key, key set, key instance, policy, account (such as a user and/or service account), and so forth.

Once the new hub entity has been identified, the system redraws the trust map with the selected entity as the hub and spoke entities as previously described. Operation 912 represents this action. The system uses indicators such as those previously discussed to "annotate" the trust relationships, the trust map entities and so forth to convey information to the user and to provide the user with the ability to manage the trust map and entities represented thereby.

In some instances, a user may desire to keep the same hub entity, but view different information (e.g., the "out" relationships as opposed to the "in" relationships) or add/remove displayed information. In this instance, operation 910 would not select a new hub, but would identify the view, information, and so forth that the user wants to display. Operation 912 would then redraw the trust map with the desired information, view and so forth.

Operation 914 represents retrieving and displaying additional information. As previously discussed, embodiments of the system display additional information about an entity/entities such as in one or more context windows. When a user desires to display this additional information, the user indicates the desired entity and the desired action (e.g., display information). The indication of the action and the selected entity/entities that is the target of the action (e.g., display information) may be performed in a single step or in multiple steps, depending on the embodiment. In some embodiments, the system brings up the context window when a user selects an entity such as by touch, tapping, clicking (left or right), rollover, search, selecting from a pick list, dropdown list or other such list, or combinations thereof. This was discussed above in conjunction with FIG. 7. In the embodiment of FIG. 7, once a context window is displayed, the user has the option to indicate the desire for a more detailed display as discussed above and as indicated by the details selector 710.

In FIG. 9, the system receives the user's indication the system should display information (operation 914), identifies the entity/entities that the information should relate to (operation 916) and displays the information (operation 918).

Operation 920 indicates that after any indicated navigation action(s) are performed, control flow may return to whatever invoked the action, such as operation 806 of FIG. 8.

Figure 10:
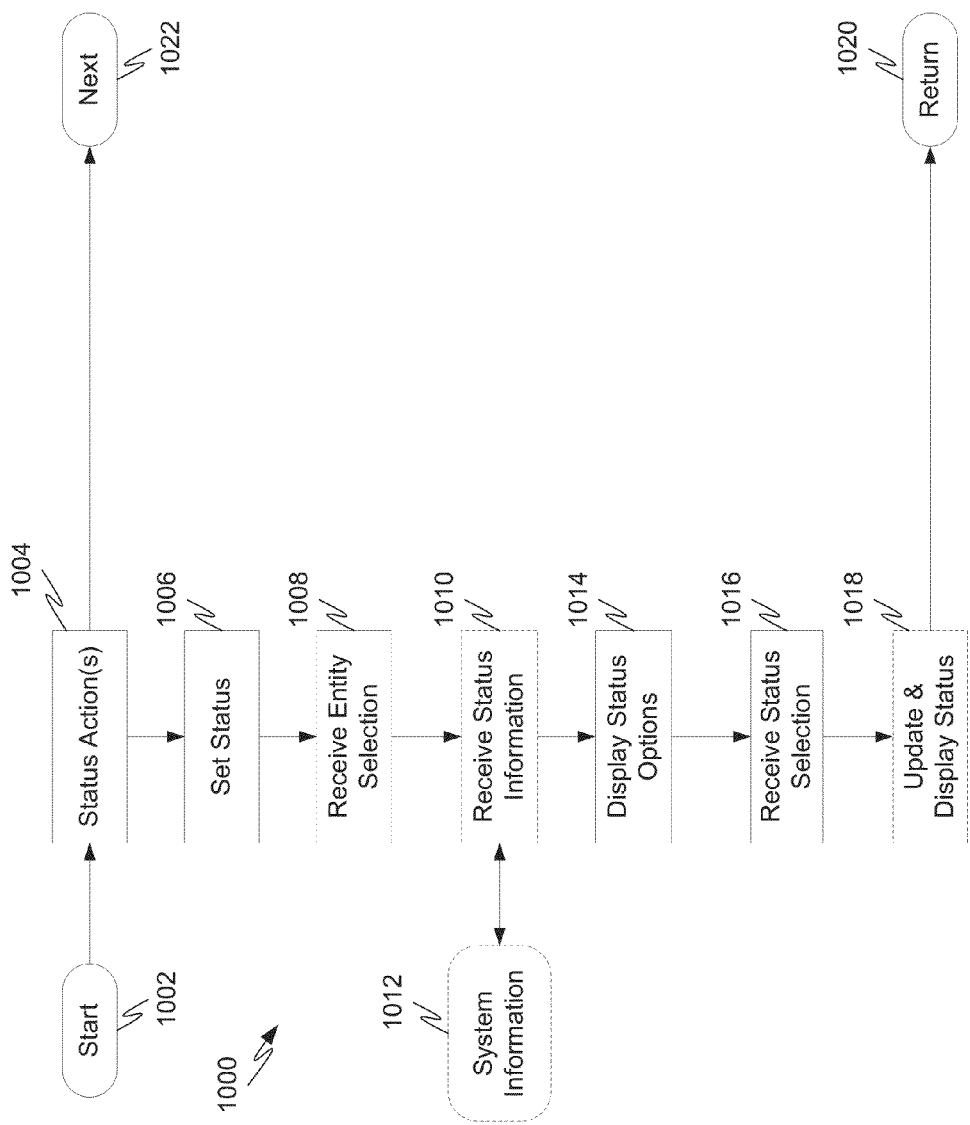
FIG. 10 illustrates representative actions that may be performed using one of the representative user interfaces.

FIG. 10 illustrates representative actions 1000 that may be performed using one of the representative user interfaces. FIG. 10 describes representative status actions for the system. The operation begins at start indicator 1002 after which status actions operation 1004 represents ensuring that the user has indicated a status action. If the user has not indicated a status action, then operation proceeds to next indicator 1006 which may then proceed to one of FIGS. 11-12 to further determine what type of action the user has indicated.

Status actions include displaying and/or setting the status of an entity or entities. Entities include, but are not limited to at least one of, server, client, client/server, key, key set, key instance, policy, account (such as a user and/or service account), and so forth. In some embodiments, the status of an entity is indicated by color, annotation, animation, shading, combinations thereof or so forth. Representative status include, but are not limited to, policy compliance status, workflow status, property status and so forth. Policy compliance has already been discussed and is further discussed below.

In some embodiments workflow status is intrinsic to the system itself. In other embodiments workflow status comes, at least in part, from some external source or system. In yet other embodiments, combinations thereof are used. Workflow status can differ depending on the user that is viewing the trust map.

For example, consider a situation where new keys have been discovered but not yet brought under management. Such a key instance is assigned an "unchecked" status. It is the administrators responsibility to examine any key instance with an "unchecked" status. Once the administrator has examined the key instance, the administrator selects a status such as "checked-ok," "suspected rogue key," "approval needed," or some other such status. If the "approval needed" status is selected, the system (or some workflow system) kicks off a workflow to garner the needed approval. While the workflow is ongoing, if there is no action for the administrator to perform, when the administrator views the key, the status is indicated such a way that the administrator knows no current action is needed on the part of the administrator. The approver, however, viewing the same trust map sees the status indicated in such a way as to remind the approver that the administrator has unhandled tasks to complete. In other embodiments, other approaches are taken where all users that view the trust map see a common status. In still other embodiments, the status that is displayed depends on at least one of: the role of the user (administrator, approver, and so forth); the identity of the user; permissions assigned to the user; and so forth.

Status can include, but are not limited to: whether the entity is in or out of policy compliance, whether the entity is checked and known bad in some way, checked-ok, checked with warnings such as a suspicious or unauthorized in some way, unchecked, jailed (e.g., entity is in some way locked to a location), locked (no changes allowed), and so forth.

As indicated above, some embodiments use annotations, color, animation and/or other mechanisms to indicate status. Additionally, or alternatively, some embodiments display status when information is displayed, such as described in conjunction with FIG. 9. Thus, FIG. 10 does not illustrate an explicit display status action. However, some embodiments include such an action.

A user indicates a set status action as indicated in operation 1006 through such mechanisms as selecting from a tool bar, menu, touching, tapping, clicking, rollover, selecting by search, selecting from a drop down or pick list, and so forth. The system receives the indication and determines which entity/entities the action should apply to (operation 1008). If needed, the system retrieves status information (operation 1010) from wherever the status is stored, including from other systems (system information 1012).

The system displays status options (operation 1014) if appropriate. For example, the system can optionally display status options if there are a limited number of states that the status can take on. In a representative example, for policy compliance, if a status for an entity may either be compliant or non-compliant, then the user may be presented with a way of selecting either of the two states. In another representative example, if the state is user defined and is free form in nature, the system presents a user with a mechanism for entering a user defined state such as a text box or other mechanism.

The system receives the entered status (operation 1016) and updates the status appropriately and displays the updated status if appropriate (operation 1018). Operation 1020 indicates that after any indicated status action(s) are performed, control flow may return to whatever invoked the action, such as operation 806 of FIG. 8.

Figure 11:
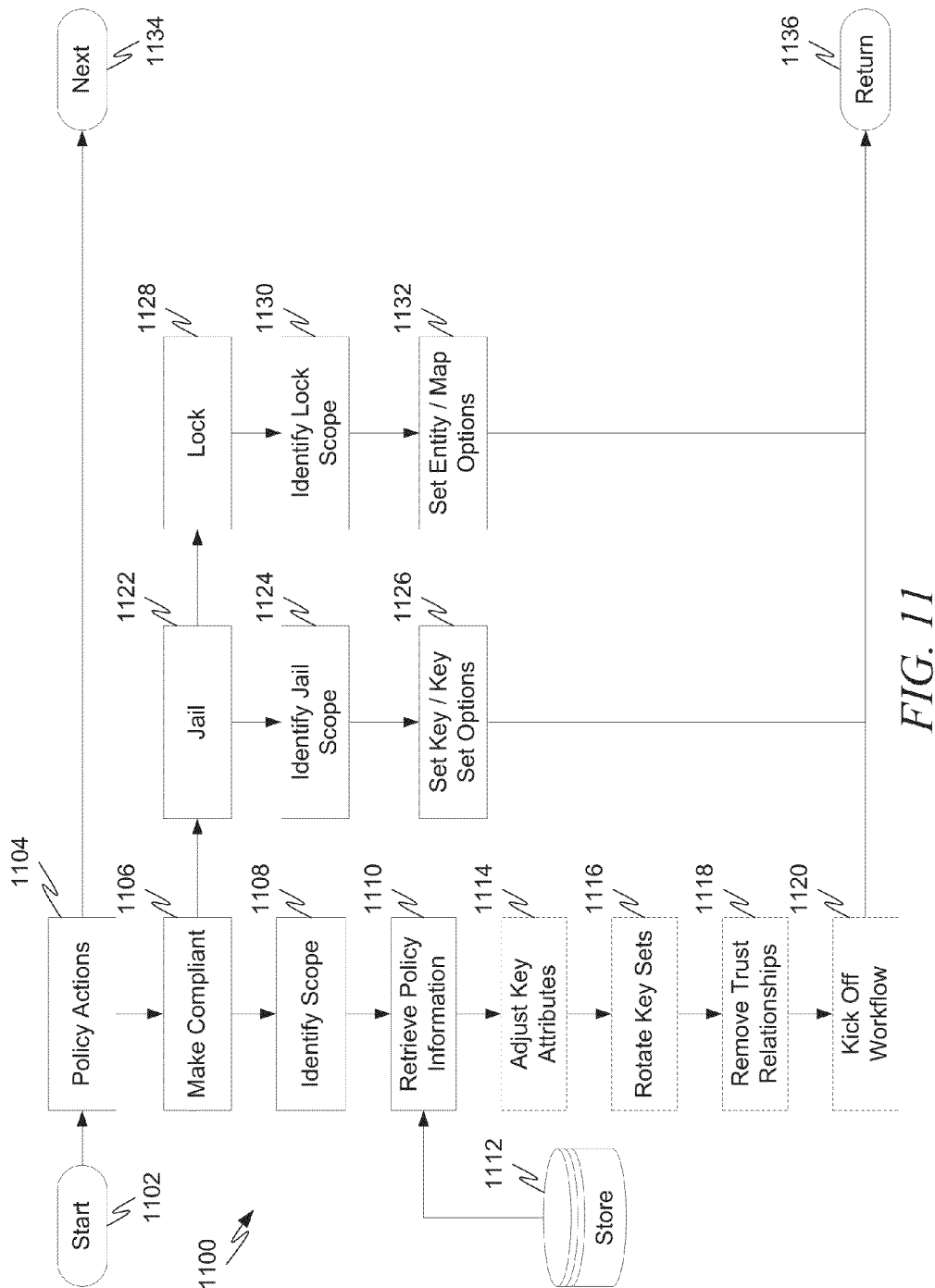
FIG. 11 illustrates representative actions that may be performed using one of the representative user interfaces.

FIG. 11 illustrates representative actions 1100 that may be performed using one of the representative user interfaces. FIG. 11 describes representative policy actions for the system. The actions begins at start indicator 1102 after which policy actions operation 1104 represents ensuring that the user has indicated a policy action. If the user has not indicated a policy action, then operation proceeds to next indicator 1134 which may then proceed to FIG. 12 to further determine what type of action the user has indicated.

Policy actions include, but are not limited to, make compliant 1106, jail 1122 and lock 1128. Make compliant 1106 makes appropriate changes to the entity/entities to ensure the entity/entities are compliant with the relevant policy/policies. In some embodiments, the user selects or otherwise indicates the scope in at least one of several ways. In one embodiment, the user indicates an entity to be made compliant. In another embodiment, the user indicates that some or all entities on a system (e.g., client, server, client/server) should be made compliant. In yet another embodiment, the user indicates some or all of the entities in the entire trust map should be made compliant. In still another embodiment, at least one of these is used. Thus, the system identifies the scope of the make compliant action in operation 1108.

In operation 1110 the system retrieves the relevant policy. In the embodiment illustrated in FIG. 11, the policy is stored in policy store 1112. However, policies may be stored in a variety of locations including with or available to the entity that the policy applies to, in a policy object hierarchy, or in some other way.

In order to make an entity/entities compliant, several actions may need to be taken. Different embodiments will take some or all of such actions, depending on the circumstances, why the entity/entities are out of policy, system configuration, permissions of the user initiating the make compliant action, and other such factor(s). The embodiment of FIG. 11 illustrates representative corrective actions that such embodiments use. The corrective actions illustrated in FIG. 11 are not intended to be an exclusive list nor represent that all such actions are available to all embodiments. However, most embodiments will generally have at least one of the representative actions of FIG. 11.

One possible action for the system to make an entity compliant is to adjust key options, key characteristics, and so forth to comply with the policy. As indicated above, a policy may have several aspects that deal with keys, key sets, key instances, and so forth. These include, but are not limited to, one or more of:

(1) Mathematical requirements for the key/key pair such as key length and algorithm used to generate the key.

(2) Format requirements for the key/key pair, which may be vendor specific (e.g., depend on the particular protocol variant used).

(3) Key file metadata requirements such as requirements for file permissions, key storage locations, access rights control/limitations, and so forth.

(4) Key options requirements such restrictions on which locations may access the key, restrictions on which users may access a key, an indication of which authentication methods are allowed, an indication of which protocol versions are allowed, an indication of compatibility, forced commands, and so forth.

(5) Key requester/contact/owner requirements (e.g., assignment of, or any restrictions on the requestor, contact and/or owner).

(6) Key approver requirements (e.g., assignment of, or any restrictions on the approver).

(7) Key permission requirements.

(8) Key expiry requirements.

(9) Grace period.

(10) Action(s) to be taken at expiry, including actions to be taken when the grace period begins and ends. Actions to be taken may include a progression of actions such as send notification (warn), then escalate if certain conditions occur, then rotate/blacklist/whitelist and so forth.

(11) Indication whether the KS should be brought under management.

(12) Indication whether key rollback is allowed

(13) Requirements on key rollback periods.

(14) Requirements for key testing for rollback.

(15) Security level (e.g., a security rating such as high, medium, low which may involve other parameters such as key length, key expiry, and so forth).

(16) Security level restrictions (e.g., cannot connect from a low security to a high security, and so forth).

One or more of aspects such as these are adjusted in representative operation 1114 to comply with the appropriate policy. As indicated above, which aspects are adjusted may also be dependent on whether a user has permissions to make a given change.

Another representative operation is operation 1116, which initiates rotation of a key set. Appropriate methods may be used to rotate a key set, for example see operations 1206-1216 of FIG. 12. In its most basic form, rotation typically proceeds by generating a new key pair, installing the new public key at locations where the old public key resides, installing the new private key at locations where the old private key resides, optionally testing the new key instances, and removing the old private key and the old public keys from locations where they reside. In some embodiments, rollback is used to rollback to the old key set under certain conditions such as new key instances fail before installing or replacing private keys, if the new key set will not work properly and so forth. In some embodiments, key rotation also includes the option to split the key instances so that a single key set is replaced with multiple key sets. For example, suppose User A has identical private keys (from key pair A1) in both client 1 and client 2. Further suppose User A has CT to server hosts 3, 4, 5 and 6. It is decided to split the private keys. A new key pair (A2) is generated for use by User A from client 2. If User A wants CT toward servers 4 and 6, the A2 public key may be provisioned to authorized keys at hosts 4 and 6. The A2 private key may then provisioned to client 2. The A1 private key may then be removed from client 2 (as operation is through the A2 key pair). The A1 public keys may then be removed from servers 4 and 6.

Representative operation 1118 indicates that making an entity compliant may lead to removal of a trust relationship. In some embodiments, removal of a trust relationship occurs, for example, where a low trust entity connects directly to a high trust entity (see the discussion with respect to FIG. 16). Removal occurs in other embodiments where a user/account does not have authorization to access particular locations or via particular protocols (e.g., active directory, Lightweight Directory Access Protocol (LDAP), etc.). Removal occurs in still other embodiments where a user/account has root access and root access is not desired or authorized. In other embodiments, one or more of these situations trigger removal of a trust relationship.

In some embodiments, users may not have permissions to fully make an entity compliant and authorizations, notification, and/or other workflow type events need to occur before an action is taken such as removal of user trust, deleting a key instance, or taking some other action to bring an entity into policy compliance. In these situations, the system may kick off a workflow. In this context, kicking off a workflow means initiating steps or a process that has been established for achieving a given result. In some embodiments the system itself handles the workflow, in other embodiments the workflow is handled by external system(s), and in still other embodiments the workflow is handled by a combination of the system and external system(s). Operation 1120 represents the option of kicking off a workflow to bring an entity into compliance.

Operation 1136 indicates that after any indicated policy action(s) are performed, control flow may return to whatever invoked the action, such as operation 806 of FIG. 8.

Figure 12:
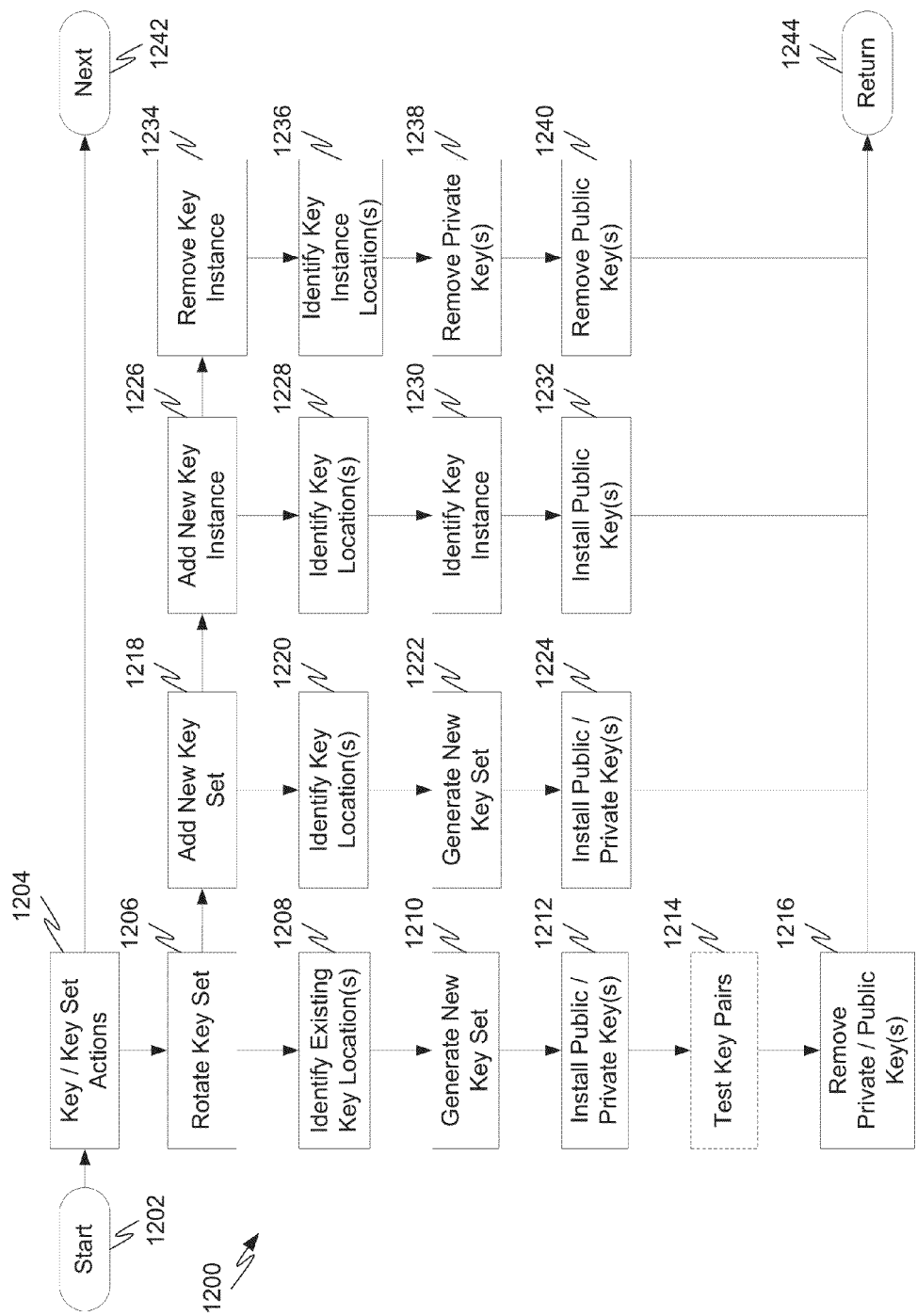
FIG. 12 illustrates representative actions that may be performed using one of the representative user interfaces.

FIG. 12 illustrates representative actions 1200 that may be performed using one of the representative user interfaces. FIG. 12 describes representative key/key set actions for the system. The actions begins at start indicator 1202 after which key/key set actions operation 1204 represents ensuring that the user has indicated a key/key set action. If the user has not indicated a key/key set action, then operation proceeds to next indicator 1242, which leads to whatever steps the system needs to determine what type of action the user has indicated.

One representative key/key set action is to rotate a key set. This is indicated by operation 1206. Rotation typically begins by identifying locations where key instances of the key set to be rotated reside as indicated by operation 1208. The system generates (or causes to be generated) a new key set (operation 1210). The system installs the new public key at locations where the old public key resides and installs the new private key at locations where the old private key resides (operation 1212). The new key instances are optionally tested (operation 1214). In some embodiments, testing may optionally be performed prior to installing/replacing private key instances. In some embodiments key rollback and/or continuing to use the old key instances is used under certain allowed conditions when the new key instances are not working correctly. Finally, the old key instances are removed in operation 1216.

Another representative key/key set action is to add a new key set as indicated in operation 1218. Adding a new key set typically starts with identifying the location(s) where key instances are to reside, along with other parameters such as which user/account the key set should be associated with, any key characteristics, key set options, and so forth to be used in order to comply with a relevant policy (operation 1220). The system generates the new key set (operation 1222) in a manner to comply with policy and the system installs (provisions) the key instances at the appropriate locations along with appropriate key options and so forth (operation 1224).

In some situations a new key instance (as opposed to a key set) is to be added as indicated in operation 1226. In some embodiments, the steps are substantially the same as when adding a new key set. Adding a new key instance typically starts with identifying the location(s) where key instances are to reside, along with other parameters such as which user/account the key instance is associated with, any key characteristics, key set options, and so forth to be used in order to comply with a relevant policy (operation 1228). The system identifies the new key instance (operation 1230) and ensures it complies with policy for the designated entity/entities and the system installs (provisions) the key instances at the appropriate locations along with appropriate key options and so forth (operation 1232).

Operation 1234 represents removing one or more key instances, including an entire key set. The operation typically involves identifying where the key instance(s) should be removed from (operation 1236). Once the key instances have been identified, any public and private key instances may be removed as shown in operation 1240 and operation 1238 respectively, depending on whether a public key instance is being removed, a private key instance is being removed, or both. In some embodiments, when both public and private key instances are removed, private key instances are removed first. In other embodiments, when both public and private key instances are removed, public key instances may be removed first.

Operation 1244 indicates that after any indicated key/key set action(s) are performed, control flow may return to whatever invoked the action, such as operation 806 of FIG. 8.

Figure 13:
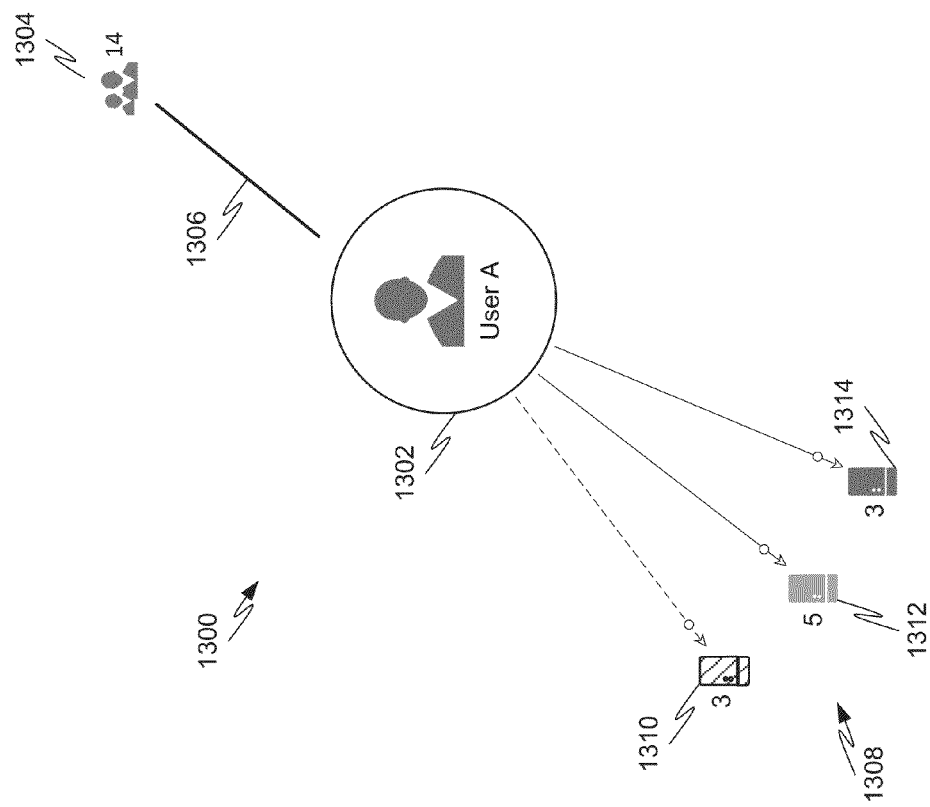
FIG. 13 illustrates a representative user interface and actions in an example embodiment.

FIG. 13 illustrates a representative user interface and actions 1300 in an example embodiment. In this illustration, consider a group of users who are all authorized to have access to a group of systems such as when members of an engineering team are authorized to access a cluster of servers set aside for their use. To manage the group of users, an administrator may select a view that shows a particular user and the systems the user currently has access to, the systems the user does not have access to (but is authorized to have access to), systems the user has access to that the user is not authorized to access and so forth.

In the representative example of FIG. 13, a group of 15 users are allowed to have access to a group of 11 systems, subject to certain policies. An administrator can select a user and place that user at the hub as shown by the hub entity 1302, which indicates the administrator is examining User A. Other members of the group 1304 are displayed in the representative embodiment, such as by a certain connection type 1306. The trust map also indicates that User A 1302 has access to three systems 1314 that comply with the appropriate policies, five systems 1312 that do not comply with appropriate policies and does not have access to three systems 1310 that User A is authorized to have access to.

At this point, the administrator can select the "non-compliant policy" systems 1312 and perform an action such as the "make compliant" action discussed above. The administrator may also grant access under appropriate policies for the systems that User A 1302 is authorized to have access to by selecting the systems User A does not currently have access to 1310 and perform a "grant access" action. Such an action is performed in some embodiments by establishing the appropriate trust relationships as previously discussed and any other system provisioning actions that should be preformed to grant access under the appropriate policies.

Figure 14:
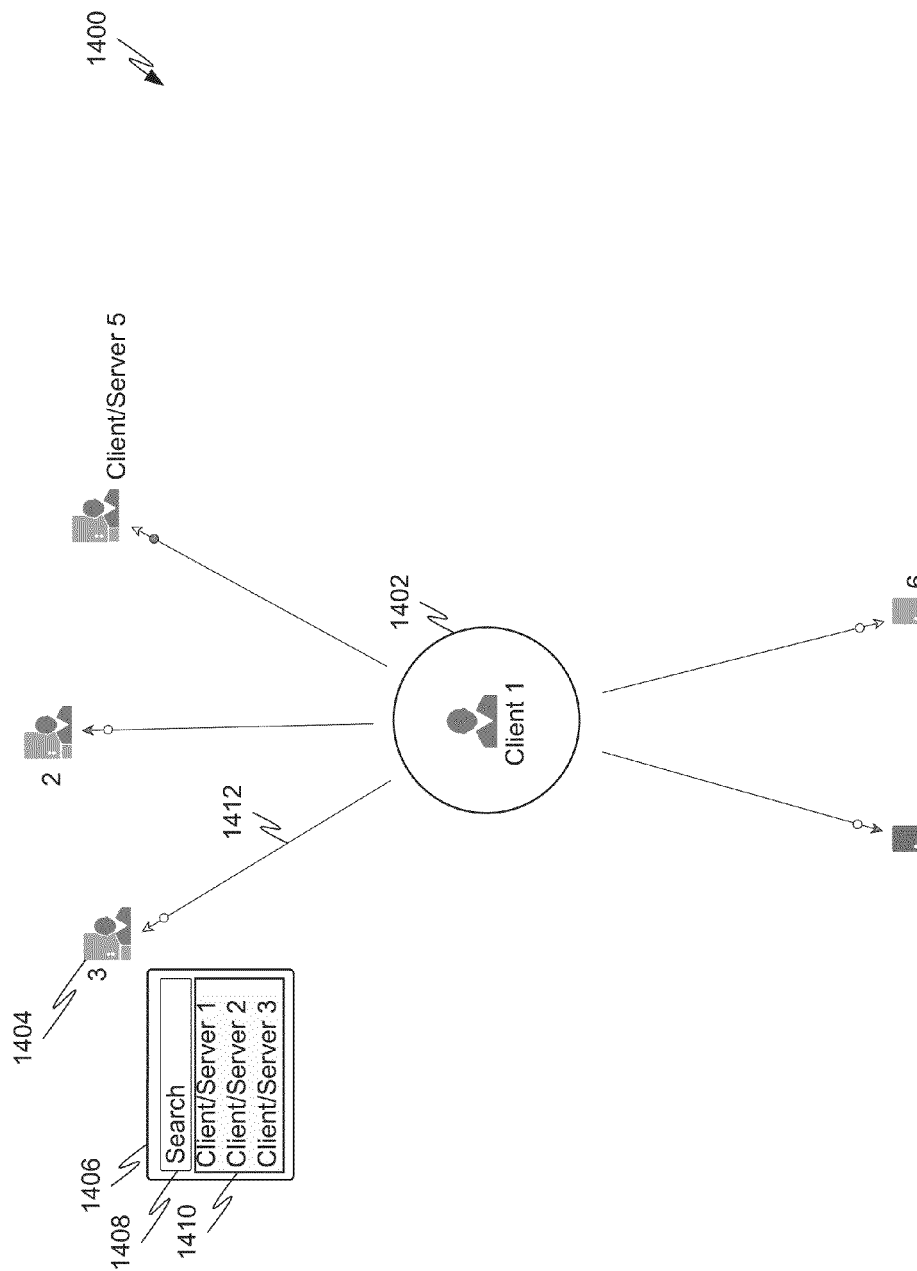
FIG. 14 illustrates a representative user interface and actions in an example embodiment.

FIG. 14 illustrates a representative user interface and actions 1400 in an example embodiment. The hub entity 1402 in this figure is a client (see the icon utilized) and has a name client 1. Several trust relationships are depicted as "out" relationships, having various characteristics or properties. One trust relationship 1412 is toward client/server group 1404. The numerical annotation indicates that there are three client/servers in the group. As indicated previously, entities may be grouped together based on different properties, characteristics, and so forth.

Prior discussion has indicated that in some embodiment, users select entities via searching. In the embodiment of FIG. 14, this is illustrated by search window 1406. Search window 1406 represents how a search is performed in some embodiments. Additionally, or alternatively, in other embodiments, the characteristics of search window 1406 are presented in other ways such as incorporating a search box into a toolbar or other user interface element.

The search window 1406 has a search box 1408, which a user may type or otherwise enter text describing the entity to be searched for. A user may search on any attribute that describes an entity such as name, entity type, entity characteristic/option, location and so forth. A wide variety of such attributes have been described elsewhere in this disclosure. The results of the search are presented in a display area 1410. In some embodiments a query builder type approach is presented so that a user can construct queries/search strings to retrieve the desired entity/entities. Finally, although single entities are indicated in the display area 1410 in FIG. 14, groups of entities can be displayed in some embodiments in response to appropriate queries.

A user can select one or more entities from the displayed search results to perform or initiate various actions, such as those that have been described herein.

Figure 15:
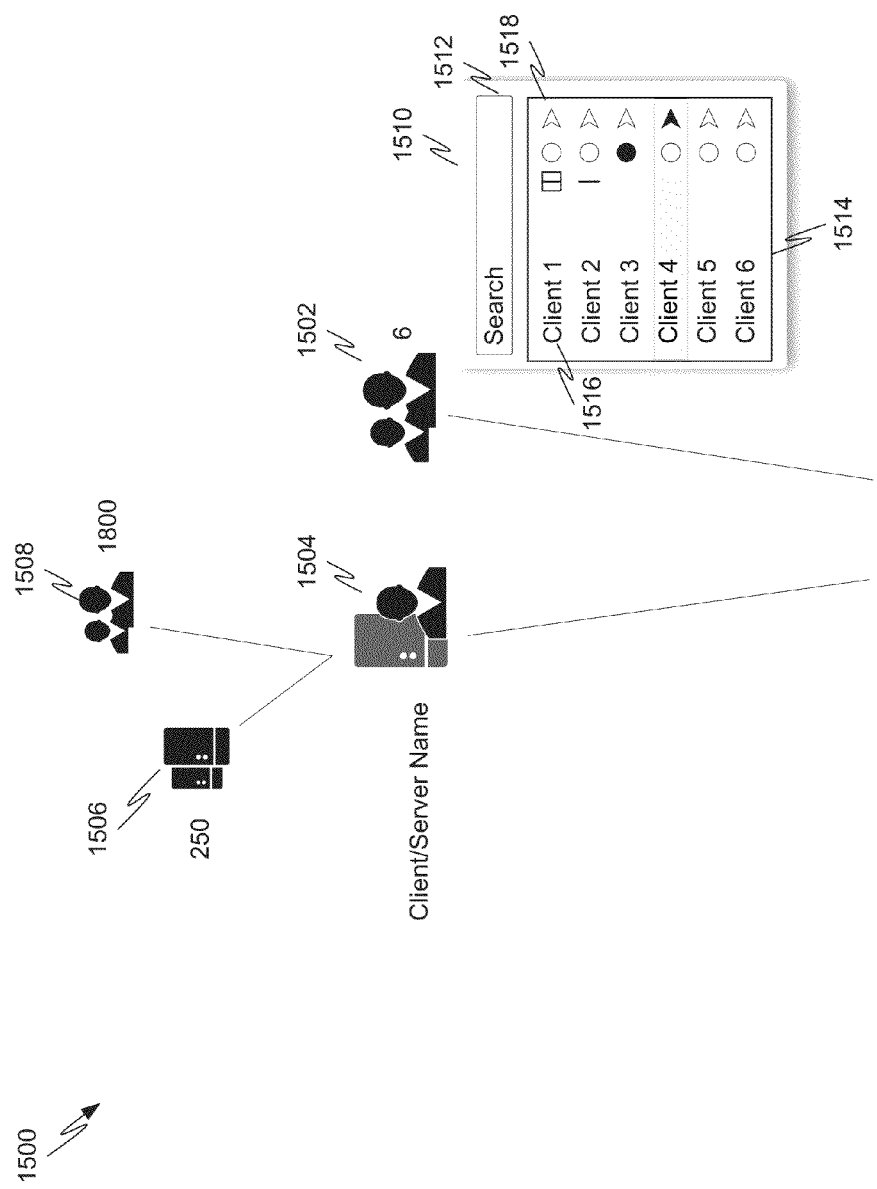
FIG. 15 illustrates another representative user interface for trust management.

FIG. 15 illustrates a representative user interface 1500 for trust management. In prior figures, a hub entity and one or more spoke entities have been illustrated. In the embodiment of FIG. 15, multiple levels of spoke entities are illustrated. Thus a hub entity (not shown) may have links to spoke entities such as the client/server 1504 and the group of clients 1502 of FIG. 15. Further spoke entities are illustrated in some embodiments tied to the spoke entity via trust relationships that exist. Thus, the client/server spoke entity 1504 has further spoke entities comprising a group of 250 servers 1506 and a group of 1800 clients 1508.

If the further spoke entities (e.g., 1506 and 1508) have common characteristics, attributes, trust relationships with the spoke entity 1504 and so forth, these common characteristics, attributes, trust relationships and so forth are illustrated via annotations, icons, color, animation and so forth as previously described. However, such attributes are removed in some circumstances such as when no commonality exists or when it is desired to simplify the display to focus the user's attention on more important information. For example, trust relationship information may be removed and further spoke entities grouped together by attributes such as the type of spoke entity, non-compliant spoke entities, and so forth in order to show that information to the user in a form that is easily understandable.

Multiple "levels" of further spoke entities may be illustrated in this manner. A user desiring more detailed information initiates action(s) to display more detailed information such as redrawing the trust map on a desired entity, bringing up a more detailed display and so forth.

FIG. 15 also illustrates window 1510. Window 1510 may represent an informational window such as the windows 702 and/or 714 of FIG. 7 or may be a search window such as the search window 1306 of FIG. 13. Window 1510 has a search entry box 1512 and a display region 1514 to display the results of the search and/or additional information if a search is not used to bring up the information. Display region 1514 displays the details of at least one of the grouped entities 1502, the trust relationships, and/or any other information that is not displayed visually on the trust map. As an example, each of the six clients in the group of clients 1502 are listed by name along with information regarding the trust relationships. For example, the first entry comprises the client name 1516 (e.g., client 1) and the trust relationship characteristics 1518 (e.g., no root access, user account and both location and forced commands).

Figure 16:
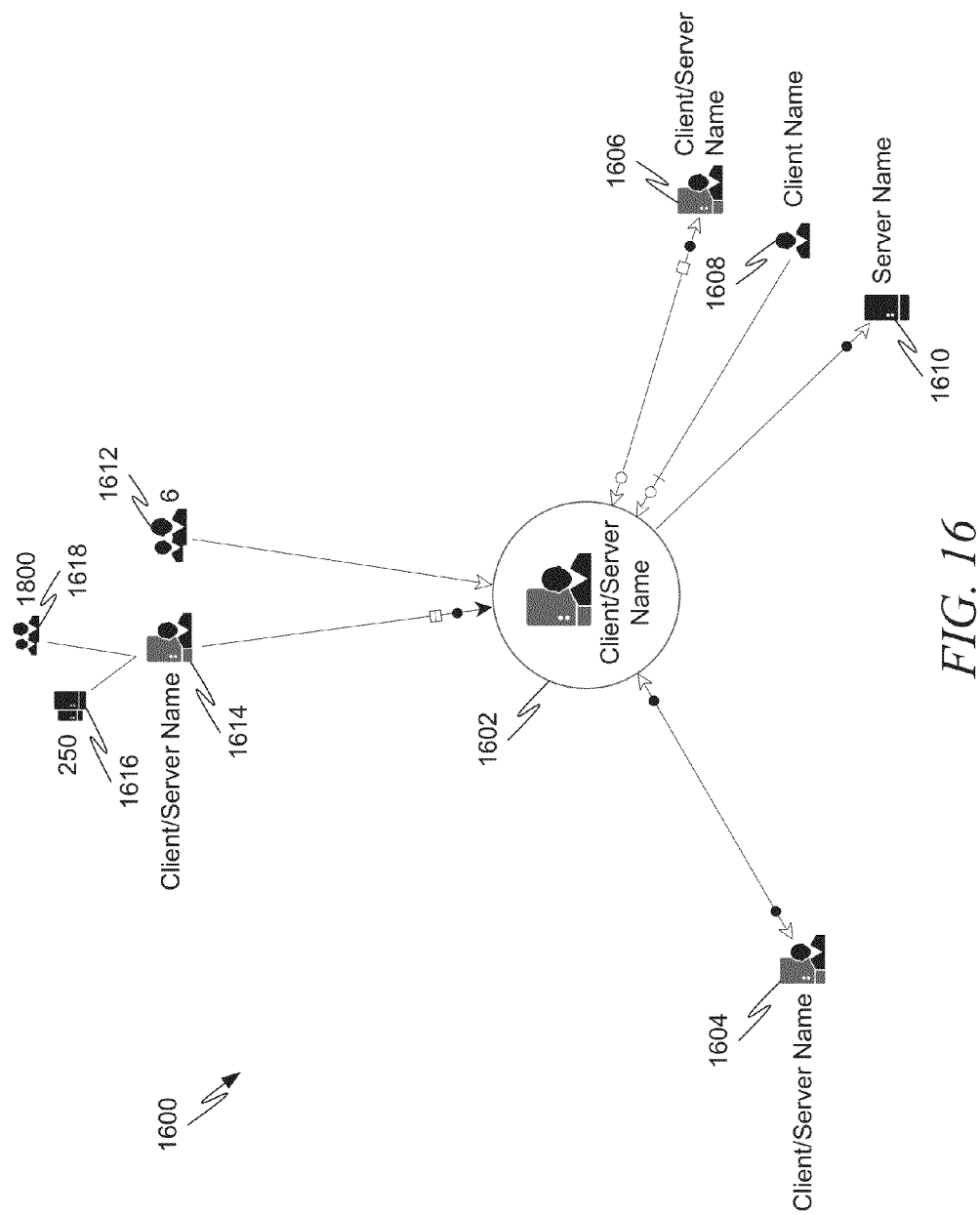
FIG. 16 illustrates another representative user interface for trust management.

FIG. 16 illustrates another representative user interface 1600 for trust management. In FIG. 16, the hub entity 1602 is a client/server that has the name displayed as part of the hub information. Surrounding the hub entity 1602 are three groups of spoke entities, one comprising client/server 1606, client 1608 and server 1610, one comprising client/server 1604, and one comprising client/server 1614, client group 1612, as well as further spoke entities server group 1616 and client group 1618. The three client groups may be organized by location (e.g., geographic, business, etc.), policy, security level, security level restrictions, or any other common attribute(s).

When spoke entities are grouped together by common trust relationship attributes and/or other attributes (e.g., client group 1612), the trust relationship annotations are displayed like account type, access permissions, forced commands, source restriction, and so forth. Alternatively, or additionally, when a group has only some of the trust relationship annotations in common while others differ, the common annotations are displayed while the differing annotations are not displayed. Similarly, further spoke entities are displayed in a similar fashion. Thus, further spoke entities 1616 and 1618 do not show any trust relationship annotations, indicating that the annotations would be different for the different entities in the groups. In some embodiments, however, a user can choose to display and/or the system displays certain important information, such as policy violations, security risks, and so forth for further spoke entities.

Figure 17:
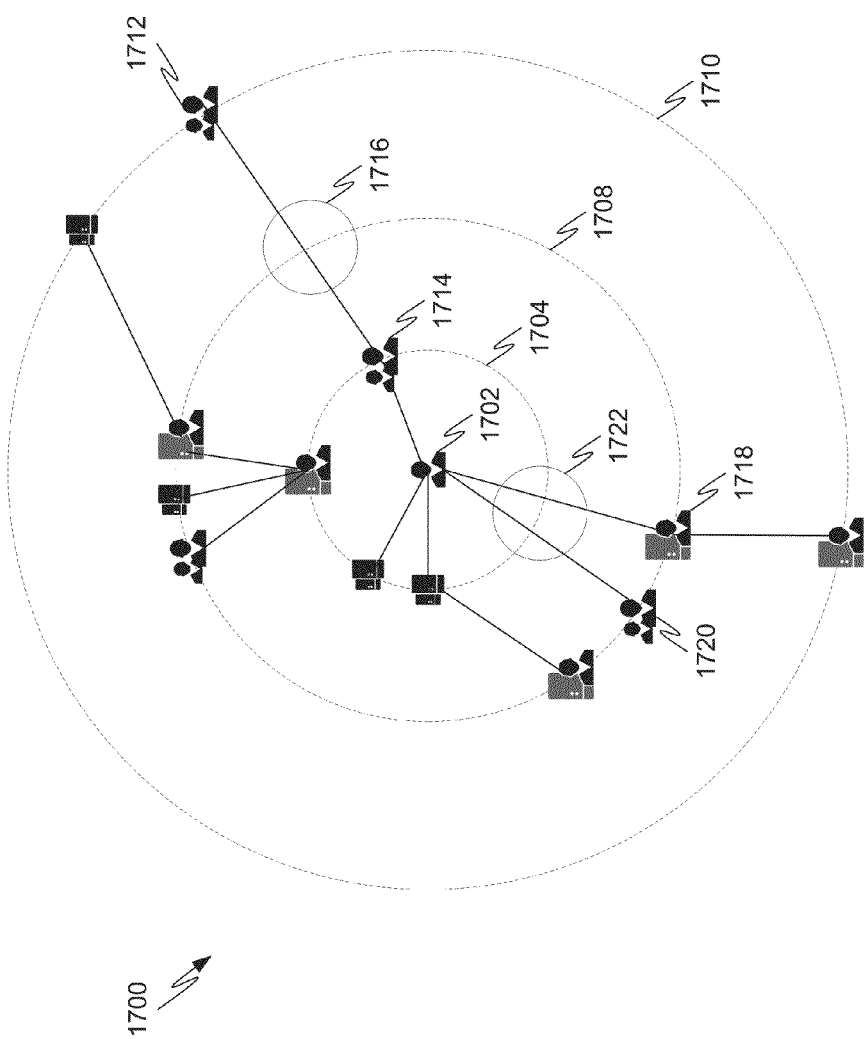
FIG. 17 illustrates another representative user interface for trust management.

FIG. 17 illustrates another representative user interface 1700 for trust management. This embodiment illustrates the notion of security levels and security level restrictions. The embodiment comprises a hub entity 1702 and multiple levels of spoke entities illustrated in "rings" 1704, 1708 and 1710. Each successive ring represents a different security level. In general, the security level will increase or decrease with the inner and/or outer rings. Whether the level increases or decreases, depends on the entity selected for the hub entity and the relative security level of the spoke entities and further spoke entities.

As an example, suppose that the security level is plotted to decrease with the successively larger rings. Although not all entities need have the same security level policies, the example will be illustrated using a common security level policy for all entities with the understanding that other example embodiments may use different security level policies for different entities. The system detects security level policy violations by looking at the trust relationships relative to the rings the trust relationships cross. For example, if the security level policy indicates that no more than one security level may be crossed by a trust relationship, the trust map of FIG. 17 indicates three security level policy violations. One violation exists where at least one member of client group 1712 has a trust relationship with client group 1714. The trust map shows that multiple rings are crossed via the trust relationship as indicated by circled area 1716. Embodiments of the system indicate violations via color, highlighting, animation, annotations, additions to the trust map to draw the user's attention (such as the circle 1716) and/or combinations thereof. Circle 1722 indicates further violations between hub 1702 and client group 1720 and between hub 1702 and client/server 1718.

Although the rings in this example represent successively increasing and/or decreasing security level, the rings may represent different information, such as communications that are allowed via policy, so that a ring does not necessarily represent any particular fixed security level. In some embodiments the rings represent trust sets (see definition section above). In these embodiments the trust sets typically, but not always, have security classification boundaries such as those described above. Thus, the rings may illustrate improper crossing of trust boundaries between trust sets in these embodiments.

Figure 18:
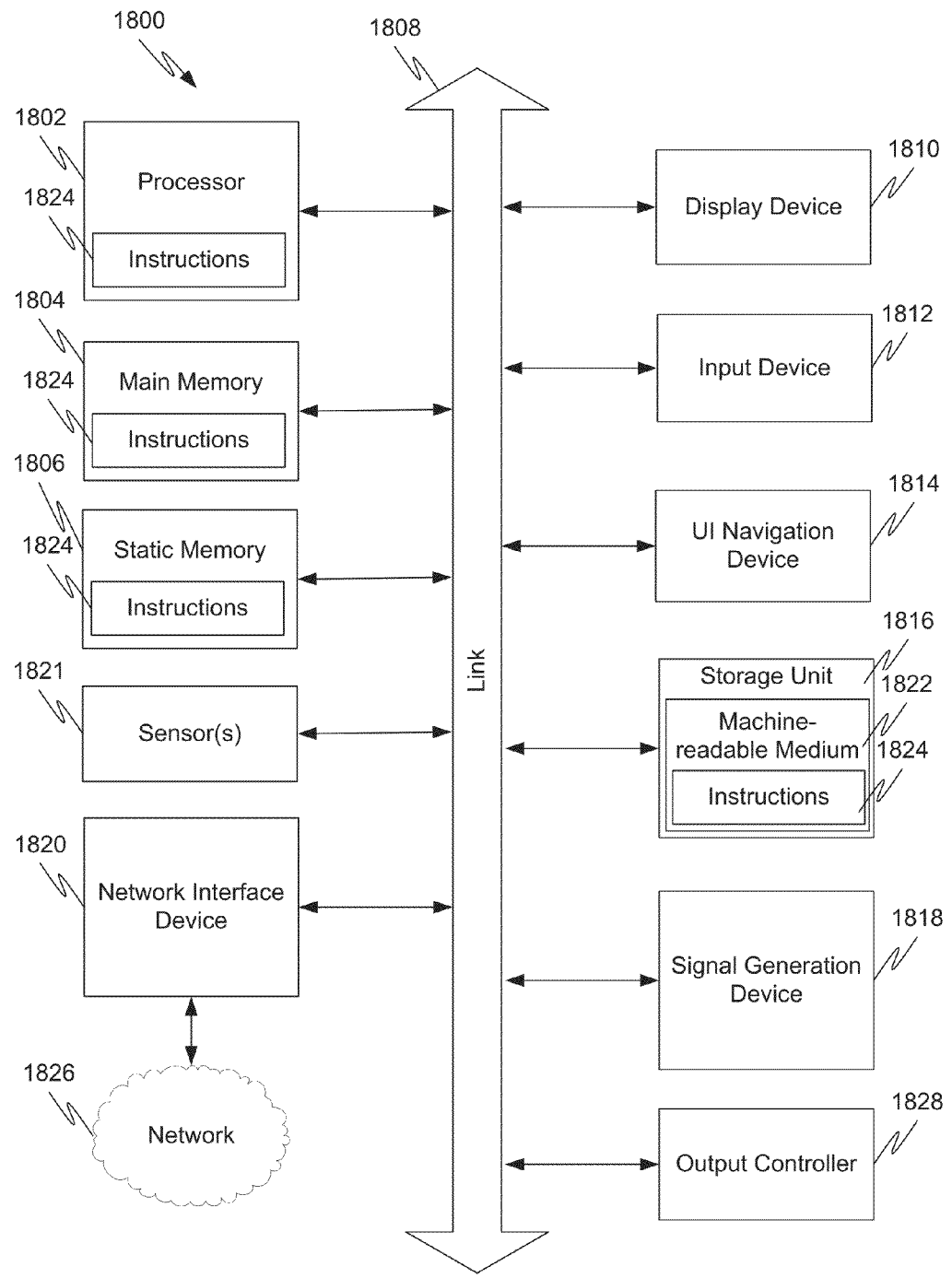
FIG. 18 is a block diagram of a machine in the example form of a processing system within which may be executed a set of instructions for causing the machine to perform any one or more of the methodologies discussed herein including the user interfaces, functions, systems and flow diagrams of FIGS. 1-17.

FIG. 18 is a block diagram of a machine in the example form of a processing system within which may be executed a set of instructions for causing the machine to perform any one or more of the methodologies discussed herein including the user interfaces, functions, systems and flow diagrams of FIGS. 1-17. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 1800 includes at least one processor 1802 (e.g., a central processing unit (CPU), a graphics processing unit (GPU), advanced processing unit (APU), or combinations thereof), a main memory 1804 (e.g., random access memory), and static memory 1806 (e.g., static random-access memory), which communicate with each other via bus 1808. The processing system 1800 may further include graphics display unit 1810 (e.g., a plasma display, a liquid crystal display (LCD), a cathode ray tube (CRT), and so forth). The processing system 1800 also includes an alphanumeric input device 1812 (e.g., a keyboard, touch screen, and so forth), a user interface (UI) navigation device 1814 (e.g., a mouse, trackball, touch device, and so forth), a storage unit 1816, a signal generation device 1828 (e.g., a speaker), and a network interface device 1820.

The storage unit 1816 (a type of non-volatile memory storage) includes a machine-readable medium 1822 on which is stored one or more sets of data structures and instructions 1824 (e.g., software) embodying or utilized by any one or more of the methodologies or functions described herein. The data structures and instructions 1824 may also reside, completely or at least partially, within the main memory 1804, the static memory 1806, and/or within the processor 1802 during execution thereof by the processing system 1802, with the main memory 1804, the static memory 1806, and the processor 1802 also constituting machine-readable, tangible media.

The data structures and instructions 1824 may further be transmitted or received over a computer network 1826 via network interface device 1820 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the processing system 1800) or one or more hardware modules of a computer system (e.g., a processor 1802 or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (for example, as a special-purpose processor, such as a field-programmable gate array (FPGA) or an application-specific integrated circuit (ASIC)) to perform certain operations. A hardware module may also include programmable logic or circuitry (for example, as encompassed within a general-purpose processor 1802 or other programmable processor) that is temporarily configured by software to perform certain operations. It will be appreciated that the decision to implement a hardware module mechanically, in dedicated and permanently configured circuitry, or in temporarily configured circuitry (for example, configured by software), may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules include a general-purpose processor 1802 that is configured using software, the general-purpose processor 1802 may be configured as respective different hardware modules at different times. Software may accordingly configure a processor 1802, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmissions (such as, for example, over appropriate circuits and buses that connect the modules). In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and may operate on a resource (for example, a collection of information).

The various operations of example methods described herein may be performed, at least partially, by one or more processors 1802 that are temporarily configured (e.g., by software) or permanently configured to perform the relevant operations. Whether temporarily or permanently configured, such processors 1802 may constitute processor-implemented modules that operate to perform one or more operations or functions. The modules referred to herein may, in some example embodiments, include processor-implemented modules.

Similarly, the methods described herein may be at least partially processor-implemented. For example, at least some of the operations of a method may be performed by one or more processors 1802 or processor-implemented modules. The performance of certain of the operations may be distributed among the one or more processors 1802, not only residing within a single machine but deployed across a number of machines. In some example embodiments, the processors 1802 may be located in a single location (e.g., within a home environment, within an office environment, or as a server farm), while in other embodiments, the processors 1802 may be distributed across a number of locations.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 1824 for execution by the machine 1800, such that the instructions 1824, when executed by one or more processors of the machine 1800 (e.g., processor 1802), cause the machine 1800 to perform any one or more of the methodologies described herein, in whole or in part. Accordingly, a "machine-readable medium" refers to at least one storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof. The term machine-readable medium specifically excludes signals per se.

While the embodiments are described with reference to various implementations and exploitations, it will be understood that these embodiments are illustrative and that the scope of claims provided below is not limited to the embodiments described herein. In general, the techniques described herein may be implemented with facilities consistent with any hardware system or hardware systems defined herein. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the claims. In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the claims and their equivalents.

What is claimed is:

1. A method for operating a computing device, the method comprising:
    obtaining a data set comprising a plurality of entities, the plurality of entities including at least one cryptographic key instance, at least one system identifier, at least one client identifier and at least one server identifier, at least one cryptographic key instance defining at least one trust relationship between a client identified by the at least one client identifier and a server identified by the at least one server identifier;
    identifying a selected entity from the data set;
    displaying at a hub region of a display device, a representation of the selected entity;
    displaying at a spoke region of the display device, a representation of a plurality of non-selected entities, wherein the selected hub entity and the plurality of non-selected spoke entities forming a hub and spoke diagram and once the selected hub entity is identified, all other non-selected spoke entities are displayed in the spoke region arranged radially relative to the selected hub entity on a trust map with the trust relationship comprising an annotation illustrating a direction of a trust relationship;
    presenting a representation of the trust relationship between the hub entity and each of the plurality of spoke entities, the trust relationship determined by at least one public/private key pair between the hub entity and each of the plurality of spoke entities;
    receiving a gesture or command indicating an action to be taken; and
    executing the action on the computing device.

2. The method of claim 1, wherein the action comprises at least one of a navigation action, a status action, a policy action, and a key action.

3. The method of claim 2 wherein:
    the navigation action comprises at least one of:
        an indication of a new selected entity that should be placed at the hub; and
        an indication of retrieving additional information related to the selected entity;
    the status action comprises retrieving or setting a status of either the selected entity or a new selected entity;
    the policy action comprises at least one of:
        an indication to make compliant with at least one policy;
        a jail action to tie a key instance to a particular system; and
        a lock action to prevent changes to at least a portion of the data set; and
    the key action comprises at least one of:
        a rotate key set action;
        a new key set action;
        a new key instance action;
        a remove key instance action; and
        a remove key set action.

4. The method of claim 1 wherein the representation of the trust relationship comprises an indication of:
    a direction of the trust relationship such that a source and a target of the trust relationship may be identified; and
    an account type of the trust relationship.

5. The method of claim 4 wherein the representation of the trust relationship further comprises an indication of at least one of:
    an indication of permissions granted on the target to the source;
    an indication of forced commands associated with a key instance;
    an indication of source restriction associated with a key instance; and
    an indication of other key options.

6. The method of claim 1 wherein the representation of the trust relationship comprises a representation of properties of the trust relationship.

7. The method of claim 6, wherein each of the at least one non-selected entities are displayed in groups, each group having common trust relationship properties.

8. A system comprising:
    a hardware processor;
    memory coupled to the processor;
    a display of a trust map upon which the processor displays a graphical user interface, the graphical user interface comprising:
    a graphical user interface element representing a hub entity selected based on whether the hub entity is a server, a client, or a client/server, the hub entity displayed at a hub region of the display;
    a graphical user interface element representing each of a plurality of spoke entities selected based on whether each spoke entity is a server, a client, or a client/server, the plurality of spoke entities displayed at a spoke region of the display, the graphical user interface elements of the hub entity and the plurality of spoke entities forming a hub and spoke diagram and once the hub entity is selected by a user, all other non-selected spoke entities are displayed in the spoke region arranged radially relative to the selected hub entity on the trust map with the trust relationship comprising an annotation illustrating a direction of a trust relationship;
    a representation of the trust relationship between the hub entity and each of the plurality of spoke entities, the trust relationship determined by at least one public/private key pair between the hub entity and each of the plurality of spoke entities, the representation comprising an annotation indicating at least one of:
    an indication of a direction of the trust relationship and
    a key option associated with the public portion of the at least one public/private key pair or the private portion of the at least one public/private key pair, or both the public portion and the private portion of the at least one public/private key pair.

9. The system of claim 8, wherein the hub entity comprises at least one of:

a server;
a client;
a client/server;
a key instance;
a key set;
a policy;
a user account; and
a user.

10. The system of claim 8 wherein the plurality of spoke entities comprises at least one of:
a server;
a client;
a client/server;
a key instance;
a key set;
a policy;
a user account; and
a user.

11. The system of claim 8 wherein each of the plurality of spoke entities has a plurality of characteristics and wherein the graphical user interface element representing each of the plurality of spoke entities are grouped by at least one common characteristic and wherein each group is displayed in a spaced relationship to other groups in the spoke region.

12. The system of claim 8 wherein the representation of the trust relationship defines a source and a target of the trust relationship and wherein the representation comprises an indication of at least one of:
an indication of permissions granted on the target to the source;
an indication of forced commands associated with a key instance;
an indication of source restriction associated with a key instance; and
an indication of other key options.

13. The system of claim 12 wherein the representation of the trust relationship further comprises an indication of a key characteristic.

14. The system of claim 12, wherein the graphical user interface further comprises a representation of further spoke entities displayed in a relationship to the at least one spoke entity but not displayed in a relationship to the hub entity.

15. The system of claim 8, wherein the graphical user interface further comprises a context window having content comprising:
detail information regarding the trust relationship;
information regarding any policy violations; and
actions that may be taken by a user with respect to the graphical user interface.

16. The system of claim 8, wherein the graphical user interface further comprises a control that allows filtering of the information presented on the graphical user interface.

17. A machine readable storage device having executable instructions encoded thereon, which when executed by a hardware processor of a system, cause the system to:
display a user interface allowing an administrator to view and interact with a plurality of entities through manipulation of visual representations of each of the plurality of entities; and
obtain a data set comprising a plurality of entities, the plurality of entities including at least one cryptographic key instance, at least one system identifier, at least one client identifier and at least one server identifier, at least one cryptographic key instance defining at least one trust relationship between a client identified by the at least one client identifier and a server identified by the at least one server identifier;
identify a selected entity from the data set;
display at a hub region of a display device, a representation of the selected entity;
display at a spoke region of the display device, a representation of a plurality of non-selected entities, wherein the selected hub entity and the plurality of non-selected spoke entities forming a hub and spoke diagram and once the selected hub entity is identified, all other non-selected spoke entities are displayed in the spoke region arranged radially relative to the selected hub entity on a trust map with the trust relationship comprising an annotation illustrating a direction of a trust relationship;
present a representation of the trust relationship between the hub entity and each of the plurality of spoke entities, the trust relationship determined by at least one public/private key pair between the hub entity and each of the plurality of spoke entities;
receive a gesture or command indicating an action to be taken; and
execute the action on the computing device.

18. The machine readable medium of claim 17, wherein the executable instructions further cause the system to:
identify a plurality of further spoke entities;
display the further spoke entities in a further spoke entity region; and
display a relationship indication between the plurality of further spoke entities and at least one non-selected entity.

19. The machine readable medium of claim 17, wherein the action comprises at least one of a navigation action, a status action, a policy action, and a key action.

20. The machine readable medium of claim 19 wherein:
the navigation action comprises at least one of:
an indication of a new selected entity that should be placed at the hub; and
an indication of retrieving additional information related to the selected entity;
the status action comprises retrieving or setting a status of either the selected entity or a new selected entity;
the policy action comprises at least one of:
an indication to make compliant with at least one policy;
a jail action to tie a key instance to a particular system; and
a lock action to prevent changes to at least a portion of the data set; and
the key action comprises at least one of:
a rotate key set action;
a new key set action;
a new key instance action;
a remove key instance action; and
a remove key set action.

* * * * *